United States Patent
Shimojo

(10) Patent No.: US 6,934,296 B2
(45) Date of Patent: Aug. 23, 2005

(54) PACKET TRANSFER DEVICE AND PACKET TRANSFER METHOD ADAPTIVE TO A LARGE NUMBER OF INPUT PORTS

(75) Inventor: Yoshimitsu Shimojo, Tokyo (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 446 days.

(21) Appl. No.: 10/190,577

(22) Filed: Jul. 9, 2002

(65) Prior Publication Data

US 2002/0167955 A1 Nov. 14, 2002

Related U.S. Application Data

(63) Continuation of application No. 08/710,478, filed on Sep. 18, 1996, now Pat. No. 6,490,248.

(30) Foreign Application Priority Data

Sep. 18, 1995 (JP) .............................. 7-238867
Aug. 13, 1996 (JP) .............................. 8-213569

(51) Int. Cl.[7] .............................................. H04L 12/54
(52) U.S. Cl. .................. 370/428; 370/412; 370/395.42
(58) Field of Search ................................ 370/229, 236, 370/428, 429, 412–418, 468, 395.4, 395.41, 395.42, 395.43; 710/52, 56, 57

(56) References Cited

U.S. PATENT DOCUMENTS

| | | | | | |
|---|---|---|---|---|---|
| 5,016,248 A | * | 5/1991 | Kudoh | ........................ | 370/413 |
| 5,222,108 A | * | 6/1993 | Suzuki | ........................ | 375/372 |
| 5,227,876 A | * | 7/1993 | Cucchi et al. | .............. | 370/235 |

(Continued)

FOREIGN PATENT DOCUMENTS

EP          603 916          6/1994

OTHER PUBLICATIONS

M. Katevenis et al., "Weighted Round–Robin Cell Multiplexing in a General–Purpose ATM Switch Chip", IEEE Journal on Selected Areas in Communications, vol. 9, No. 8 (Oct. 1, 1991), pp. 1265–1279.

H. J. Chao et al., "A VLSI Sequencer Chip for ATM Traffic Shaper and Queue Manager", Communication for Global Users, IEEE, vol. 3 (Dec. 6, 1992), pp. 1276–1281.

Y Ok Park et al., "Omega Network–Based ATM Switch with Neural Networked–Controlled Bypass Queueing and Multiplexing", IEEE Journal on Selected Areas in Communications, vol. 12, No. 9 (Dec. 1, 1994), pp. 1471–1480.

(Continued)

Primary Examiner—Ajit Patel
(74) Attorney, Agent, or Firm—Foley & Lardner LLP

(57) ABSTRACT

A packet transfer device that can be easily realized even when a number of input ports is large. Each input buffer temporarily stores entered packets class by class, and outputs packets of a selected class specified by the control unit, while the control unit determines the selected class of packets to be outputted from the input buffers according to a packet storage state in the packet storage units of the input buffers as a whole for each class. Each input buffer can temporarily store entered packets while selecting packets to be outputted at a next phase, and the control unit can specify packets to be selected in the input buffers according to an output state of packets previously selected in the input buffers as a whole. Packets stored in the buffer can be managed in terms of a plurality of groups, and each packet entered at the buffer can be distributed into a plurality of groups so that packets are distributed fairly among flows. The packets belonging to one of a plurality of groups are then outputted from the buffer toward the output port. A packet transfer at the buffer can be controlled by issuing a packet transfer command according to a log of packet transfer commands with respect to the buffer and a packet storage state of the buffer.

3 Claims, 16 Drawing Sheets

U.S. PATENT DOCUMENTS

| | | | | |
|---|---|---|---|---|
| 5,241,543 A | * | 8/1993 | Amada et al. | 370/509 |
| 5,268,900 A | | 12/1993 | Hluchyj et al. | |
| 5,272,728 A | * | 12/1993 | Ogawa | 375/372 |
| 5,412,648 A | | 5/1995 | Fan | |
| 5,463,620 A | | 10/1995 | Sriram | |
| 5,499,238 A | | 3/1996 | Shon | |
| 5,521,923 A | | 5/1996 | Willmann et al. | |
| 5,533,020 A | | 7/1996 | Byrn et al. | |
| 5,550,823 A | | 8/1996 | Irie et al. | |
| 5,555,265 A | | 9/1996 | Kakuma et al. | |
| 5,557,604 A | * | 9/1996 | Usumi et al. | 370/253 |
| 5,563,891 A | * | 10/1996 | Wang | 370/505 |
| 5,663,962 A | * | 9/1997 | Caire et al. | 370/535 |

OTHER PUBLICATIONS

R. Fan et al., "Expandable ATOM Switch Architecture (XATOM) for ATM LANs", Serving Humanity Through Comm. Supercomm/ICC, New Orleans, vol. 1 (May 1994).

Shreedhar et al., "Efficient Fair Queueing using Deficit Round Robin", SIGCOMM '95 (1995), pp. 231–242.

Golestani, "A Self–Clocked Fair Queueing Scheme for Broadband Applications", IEEE INFOCOM (1994), pp. 636–646.

Brown, "Calendar Queues: A Fast 0(1) Priority Queue Implementation for the Simulation Event Set Problem", Communications of the ACM, vol. 31, No. 10 (1988), pp. 1220–1227.

* cited by examiner

PACKET TRANSFER DEVICE AND PACKET TRANSFER METHOD ADAPTIVE TO A LARGE NUMBER OF INPUT PORTS

This application is a continuation of application Ser. No. 08/710,478, filed Sep. 18, 1996, now U.S. Pat. No. 6,490,248.

BACKGROUND OF THE INVENTION

1. Field of the Invention

The present invention relates to a packet transfer device such as a cell multiplexing device and a cell buffer device in an ATM communication network. Since a cell switch can be formed by combining a plurality of cell multiplexing devices, the present invention is also applicable to a cell switch which has each output port in a configuration of a cell multiplexing device according to the present invention. The cell buffer device of the present invention is not necessarily limited to handling of cells and is applicable to a buffer device in general. The present invention is also not necessarily limited to an application to the ATM communication network and is applicable to a packet switching network as well.

2. Description of the Background Art

Currently, researches on an ATM (Asynchronous Transfer Mode) communication scheme are actively conducted by researchers of the communication technology throughout the world. In an ATM communication scheme, fixed length packets called cells are used to transmit and switch information. In an ATM communication scheme, a high speed cell switching can be realized by a cell switch provided by the hardware inside a switch node, so that it is possible to realize an information transfer performance per unit time much superior than those of the existing communication networks.

An ATM communication scheme can set up a plurality of logical connections (Virtual Connection: VC) in one physical transmission link by using a connection identifier information called VPI (Virtual Path Identifier) and VCI (Virtual Channel Identifier) to be provided in a header of a cell. At each switch node within the network, routes are set up in advance for each VC, and the switch node determines an output route for outputting the cell according the connection identifier VPI and VCI of the cell. VPI and VCI are uniquely assigned at each physical transmission link between the switch nodes, so that the switch node has a function of rewriting values of VPI and VCI of a passing cell.

Up to now, the VC for which the quality is guaranteed in the ATM network has been either a CBR (Constant Bit Rate) connection or a VBR (Variable Bit Rate) connection. The CBR connection is a VC for transmitting the traffic in which the cell transmission rate (that is, a number of transmission cells per unit time, which is also referred to as a cell rate or a bandwidth) is constant and known in advance. The VBR connection is a VC for transmitting the traffic in which the cell transmission rate is not constant but some traffic characteristics such as a maximum value (peak rate) and an average value (average rate) are known in advance.

Basically, in a case of multiplexing a plurality of VCs in one physical transmission link while maintaining a sufficient quality, it is sufficient for a sum of the peak rates of all the VCs to be not greater than the bandwidth of the physical transmission link. This scheme is called a peak rate allocation. It is possible for the peak rate allocation to realize a sufficiently high physical transmission link utilization efficiency in a case of dealing only with the CBR connections, but a physical transmission link utilization efficiency cannot be very high in a case of dealing with the VBR connections. For this reason, there are many studies on a technique for improving the physical transmission link utilization efficiency by using the statistical multiplexing effect according to the traffic characteristics known in advance while maintaining the quality.

However, the ATM communication between computers is characterized by the fact that the traffic characteristics such as an average rate cannot be predicted in advance, and the characteristic called burstiness which indicates a coexistence of some timing at which a large amount of cells are transmitted instantaneously and some other timing at which no cell is transmitted. Consequently, for the ATM communication between computers, it is difficult to improve the network utilization efficiency while maintaining the quality by using the techniques used for CBR and VBR.

More specifically, for data transferred between computers, when the peak rate allocation is utilized to guarantee the quality, the network utilization efficiency will be lowered considerably, whereas when the statistical multiplexing effect is utilized as in a case of VBR, a large amount of cells arrive simultaneously at some output port of the cell switch because of the burstiness of the traffic, and the cell loss due to the buffer overflow will be caused unless a sufficient buffer capacity is provided at the cell switch. In addition, when the cell loss is caused, a re-transmission in unit of a packet formed by a plurality of cells will be carried out, so that the effective throughput will be lowered.

For this reason, in recent years, a service class called ABR (Available Bit Rate) has been proposed and studied. In this ABR, the network utilization efficiency is improved while guaranteeing the cell transfer quality (especially a quality concerning cell loss) by applying a flow control between terminals and switch nodes. In the ABR connection, when the switch node is about to fall into the cell congestion state, the source terminals are controlled to suppress cell transmissions before the cell congestion occurs at the switch node. Here, the traffic control information to be given to terminals is mainly carried by a cell called RM (Resource Management) cell. This traffic control from the switch node to the source terminal in the ABR has an unignorable delay time, so that there is a need to implement a large capacity buffer at the cell switch so as not to discard cells until the traffic control begins to function effectively.

Apart from these CBR, VBR and ABR, there is a service class called UBR (Unspecified Bit Rate) which is a class of the so called best effort service in which a terminal is not required to declare the characteristics of traffic to be outputted in detail to the network, but instead the network does not guarantee the transfer quality at all.

As described above, data between computers have the burstiness, so that in order to realize a satisfactory level of the cell loss rate for the UBR connections, it is considered that the implementation of a large capacity cell buffer in the cell switch is necessary.

Fortunately, the transfer delay time and the transfer delay jitter required by the traffic between computers are often not so severe compared with those required for the CBR and VBR. By implementing a large capacity cell buffer in the cell switch, the delay time and the delay jitter for the cell transmission increase, but it is considered that there are many applications that can tolerate such an increase of the delay time and the delay jitter.

In particular, in a case of the ABR and UBR services, it is considered necessary to provide means for avoiding the congestion of the network. One known means for avoiding the congestion is the so called EFCI (Explicit Forward Congestion Indication). In the EFCI, a header of each cell has an EFCI bit as an indication of a congestion experienced by that cell, and a cell switch within the network marks the EFCI but according to the congestion state. As each terminal utilizes the information of the EFCI, it becomes possible to avoid the congestion.

Next, the conventional per-VC fair queueing in the cell multiplexing device and the cell switch will be described.

First, the per-VC fair queueing which is required as the robustness in the ABR service will be described.

The ABR service works as the source terminal controls the transmission of cells according to the traffic control information given from the network. If some terminal ignores (either by fault or intentionally) the traffic control information given from the network, it may be difficult to recover from the congestion of the network.

This problem can be resolved by carrying out the per-VC fair queueing at a cell multiplexing device or a cell switch, so as to realize the fair cell multiplexing scheduling among VCs and the fair buffer allocation among VCs. By carrying out the per-VC fair queueing, the interaction among VCs can be suppressed to the minimum, and even if there is a VC which ignores the traffic control information, only that VC would fall into the congestion and the influence of that VC to the other VCs can be suppressed.

In addition, the per-VC fair queueing is also required from the fairness of the UBR service.

FIG. 1 shows an example of an unfair bandwidth allocation in the UBR service. In this example, the network has four terminals A, B, C and D, and one file server FS, which are connected through cell switches (or cell multiplexing devices) X, Y and Z and links 1, 2, 3, 4, 5, 6 and 7.

Now, when each cell switch is to multiplex cells regardless of a number of VCs set up to its input links, each cell switch treats the input ports equally. For example, at the cell switch X, in a case of multiplexing cells from the links 2 and 3 into the link 1, the cell switch X treats both links equally, so that if the bandwidth of the link 1 is 1.0, the bandwidth of 0.5 would be given to each of the links 2 and 3.

By the similar consideration, the bandwidth eventually given to each terminal would have the largest value 0.5 for the terminal A and the smallest value 0.125 for the terminals C and D. This is far from the ideal in which all terminals should be making accesses to the file server FS equally.

In addition, when the network falls into the congestion, the network transmits the EFCI information so that each terminal makes its bandwidth smaller. At this point, if there are terminals which obeys the EFCI information faithfully and terminals which ignore the EFCI information within the network, there is a problem in that only the terminals which are faithful to the EFCI information would suppress the cell transmission, and the terminals which ignore the EFCI information would end up obtaining unfairly large bandwidth resources.

These problems are caused by the fact that the cell switch treats the input links equally by ignoring a number of VCs multiplexed in each link. When the cell switch carries out the per-VC fair queueing and distributes the bandwidth according to a number of VCs, it becomes possible for the terminals to make accesses to the file server fairly.

Next, the conventional cell multiplexing device for carrying out the priority control among classes will be described.

FIG. 2 shows a configuration of a conventional cell multiplexing device for carrying out the priority control among classes. This cell multiplexing device of FIG. 2 is for multiplexing cells entered from N pieces of input ports into one piece of output port.

In the output buffer 101, cells of each class are separated by a class separation unit 102, and stored in a cell storage unit (101-1, 101-2, or 101-3) for each class provided therein, and a cell selection unit 103 selectively outputs cells to the output port according to the priority level of each class.

In addition, a number of cells stored in each buffer storage unit of the output buffer 101 is compared with a threshold value to generate a respective backpressure signal.

Each input buffer 100 also has a cell storage unit (100-1, 100-2, or 100-3) for each class, and cells are transferred to the output buffer 101 according to the priority level of each class among the classes which are permitted to output cells according to the backpressure signals.

In this configuration, there is a need to provide a plurality of cell storage units class by class in the output buffer, so that there is a drawback in that the realization of the output buffer becomes difficult when a number of classes increases. In particular, it has been necessary for the input rate of the output buffer to be N times greater (where N is a number of input ports) than a rate at the input port, so that when a number of classes and a number of input ports are large, it has been difficult to realize the output buffer with such complicated functions.

When the configuration of FIG. 2 is considered as one output port portion of a cell switch, the same problem also exists for the the cell switch which has buffers for the input ports.

Next, the conventional cell multiplexing device will be described. Here, the problems associated with a cell multiplexing device having input buffers as shown in FIG. 3 will be described.

FIG. 3 shows a cell multiplexing device for multiplexing cells entered from N input ports into one output port.

The output buffer 111 temporarily stores cells from the input ports and outputs cells according to a rate of an output port.

A number of cells stored in the output buffer 111 is compared with a threshold value to generate a backpressure signal. The input buffer 101 has one queue in correspondence to the output port, and transfers cells to the output buffer 111 only when the output is permitted by the backpressure signal.

Such a cell multiplexing device treats the input buffers 110 equally regardless of a number of VCs set up, so that there has been problems concerning the robustness in the ABR service and the fairness in the UBR service.

When the configuration of FIG. 3 is considered as one output port portion of a cell switch, the same problem also exists for the the cell switch which has buffers for the input ports.

Next, the conventional per-VC fair queueing in the cell buffer device will be described.

FIG. 4 shows a configuration of FIFO for each VC which realizes the per-VC fair queueing.

FIG. 4 shows a case of a cell buffer device in which the connection identifier information of the cell entered from the input link is notified to a buffer pointer management unit 130, the cell is temporarily stored in a cell buffer 131 by obtaining a write pointer indicating a writing position of the cell given from the buffer pointer management unit 130, and the cell is read out from the cell buffer 131 according to a read pointer indicating a cell to be read out given from the buffer pointer management unit 130 and outputted to the output link. The buffer pointer management unit 130 manages a buffer pointer indicating a position of each stored cell on the cell buffer 131.

Here, the buffer pointer management unit 130 manages the buffer pointer for each VC by using a VC table. FIG. 4 shows a well known management scheme using the pointer chain.

When the cell is entered, a buffer pointer is taken out from a head of an idle chain as the write pointer, and attached to a tail of the chain for VC corresponding to the input cell. At a time of outputting cell, a VC storing the cell is selected fairly, and a buffer pointer at its head is taken out as a read pointer. As a method for selecting a VC fairly at a time of cell output, the round robin scheme is known.

In order to select a VC by the round robin scheme, it is necessary to carry out the sequential search through the VC table as to whether there is any cell stored in the buffer, starting from a VC next to a VC which was outputted previously. It may be necessary to carry out this search for as many as almost all VCs within one cell period, but there are cases in which a number of VCs to be set up is well over several thousands, so that it has been difficult to realize this scheme in practice.

Next, the conventional cell buffer device for carrying out the priority control will be described.

FIG. 17 shows an exemplary configuration of a conventional cell buffer device for carrying out the priority control.

This cell buffer device of FIG. 17 has a class-1 cell storage unit 500-1 for temporarily storing cells with a low priority concerning the delay and a class-2 cell storage unit 500-2 for temporarily storing cells with a high priority concerning the delay, and their outputs are multiplexed by a class multiplexing FIFO 510.

A class management unit 520 receives a number of cells Na in the class-2 cell storage unit 500-2, and a number of cells Nb in the class multiplexing FIFO 510 as inputs, and issues a transfer commands to either class-1 or class-2, so that only the cell storage unit 500 of a class which received the transfer command will transfer cells to the class multiplexing FIFO 510.

In order to improve the performance of the priority control in this cell buffer device of FIG. 17, it is necessary to keep a number of cells stored in the class multiplexing FIFO 510 small, but in order not to lower the throughput, it is necessary to command the transfer so that the class multiplexing FIFO 510 will not become empty as much as possible (that is, so as not to cause the underflow in the class multiplexing FIFO 510). In addition, when either one of the cell storage unit 500 is empty, if the transfer is commanded to the empty cell storage unit 500 (a case which will be referred to as a vain-command in the following description), there would be a possibility for causing the underflow, so that it is necessary to issue the transfer command with respect to the cell storage unit 500 in which a stored cell exists.

According to these policies, the condition by which the class management unit 520 issues the transfer command to the class-2 cell storage unit 500-2 can be given by:

$(Nb \leq 1)$ and $(Na \geq 1)$, while the condition for the transfer command to the class-1 cell storage unit 500-1 can be given by:

$(Nb \leq 1)$ and $(Na = 0)$.

Now, consider a case in which the delay times exist for a transmission of a number of cells information from the cell storage unit 500 or the class multiplexing FIFO 510 to the class management unit 520, a transmission of the transfer command from the class management unit 520 to the cell storage unit 500, and a cell transfer from the cell storage unit 500 to the class multiplexing FIFO 520. In such a case, the following problems are encountered conventionally.

First, due to these delay times, it has been impossible for the class management unit 520 to accurately judge whether the underflow is going to be caused in the class multiplexing FIFO 510 or not. For this reason, conventionally, the condition for not causing the underflow has been given by the comparison of a number of cells within the class multiplexing FIFO with a threshold value which is set larger for the delay time part. As a result, the average queue length of the class multiplexing FIFO 510 has been made longer, and this in turn has been lowering the performance of the priority control.

Also, because of the delay of a transmission of the information from the high priority class-2 cell storage unit 500-2, it has been impossible to accurately judge whether the class-2 cell storage unit 500-2 becomes empty or not. For this reason, there have been a case of issuing the vain-command by judging an actually empty state erroneously as not empty, or a case in which the output of the low priority class-1 cells with priority over the high priority class-2 cells is commanded by judging an actually not empty state erroneously as empty. As a result, the problems of a lowering of the throughput of the cell buffer device or a lowering of the performance have been encountered conventionally.

Note that the similar problems can also arise in various cell buffer devices other than the cell buffer device for carrying out the priority control. Namely, in a cell buffer device in which a management unit commands the cell transfer among a plurality of buffers, when the delay times exist for a transmission of a buffer information to the management unit, a transmission of the transfer command from the management unit to the buffer, and a cell transmission among the buffers, the similar problems of a lowering of the throughput of the cell buffer device or a lowering of the performance have been encountered conventionally.

Firstly, as there is a need to provide a plurality of cell storage units class by class in the output buffer, the realization of the output buffer becomes difficult when a number of classes increases. In particular, it has been necessary for the input rate of the output buffer to be N times greater (where N is a number of input ports) than a rate at the input port, so that when a number of classes and a number of input ports are large, it has been difficult to realize the output buffer with such complicated functions.

Secondly, as the conventional cell multiplexing device treats the input buffers equally regardless of a number of VCs set up, there has been problems concerning the robustness in the ABR service and the fairness in the UBR service.

On the other hand, the conventional cell buffer device is associated with the following problems.

Namely, in order to select a VC by the round robin scheme, it is necessary to carry out the sequential search through the VC table as to whether there is any cell stored in the buffer, starting from a VC next to a VC which was outputted previously. It may be necessary to carry out this search for as many as almost all VCs within one cell period, but there are cases in which a number of VCs to be set up is well over several thousands, so that it has been difficult to realize this scheme in practice.

In this regard, recently, there is a proposition of an algorithm to resolve this problem, as disclosed in M. Shreedhar & G. Varghese: "Efficient Fair Queueing using Deficit Round Robin", ACM SIGCOMM '95, pp. 231–242, August 1995. This algorithm called DRR proposed in this paper manages VCs storing cells by using a concept of an active list, so that the search through the VC table is not necessary at a time of cell output. Consequently, even when a number of VCs to be set up is increased, it is possible to realize the selection of a cell to be outputted at high speed for the purpose of the per-VC fair queueing.

However, this DRR algorithm has a drawback in that a number of packets in proportion to a value of weight set up to each VC will be outputted at once because the packets are stored in the VC by VC classification, so that the output traffic resulting from this DRR algorithm will be very bursty.

In addition, in a cell buffer device in which a management unit commands the cell transfer among a plurality of buffers, when the delay times exist for a transmission of a buffer information to the management unit, a transmission of the transfer command from the management unit to the buffer, and a cell transmission among the buffers, the problems of a lowering of the throughput of the cell buffer device or a lowering of the performance have been encountered conventionally.

SUMMARY OF THE INVENTION

It is therefore an object of the present invention to provide a packet transfer device and a packet transfer method using the priority control among classes, which are easy to realize even when a number of input ports is large.

It is another object of the present invention to provide a packet transfer device and a packet transfer method capable of carrying out the per-VC fair queueing which realizes the robustness in the ABR service and the fairness in the UBR service.

It is another object of the present invention to provide a packet transfer device and a packet transfer method capable of carrying out the per-VC fair queueing which can be realized easily without being affected by an upper limit of a number of VCs that can be set up.

It is another object of the present invention to provide a packet transfer device and a packet transfer method capable of preventing a lowering of the throughput or the performance of the priority control when a management unit commands the cell transfer among a plurality of buffers, even if the delay times exist for a transmission of a buffer information to the management unit, a transmission of the transfer command from the management unit to the buffer, and a cell transmission among the buffers.

According to one aspect of the present invention there is provided a packet transfer device, comprising: a plurality of input buffers for temporarily storing packets belonging to a plurality of classes; a control unit for controlling the input buffers; and at least one output port for transferring packets outputted from the input buffers; wherein each input buffer has packet storage means for temporarily storing entered packets class by class, and an output means for outputting packets of a selected class specified by the control unit from the packet storage means toward the output port; and the control unit determines the selected class of packets to be outputted from the input buffers according to a packet storage state in the packet storage means of the input buffers as a whole for each class, and issues a command specifying the selected class to the input buffers.

According to another aspect of the present invention there is provided a packet transfer device, comprising: a plurality of input buffers for temporarily storing packets; a control unit for controlling the input buffers; and at least one output port for transferring packets outputted from the input buffers; wherein each input buffer has packet storage means for temporarily storing entered packets, selection means for selecting packets to be outputted from the packet storage means, and an output means for outputting packets selected by the selection means toward the output port; and the control unit issues a command commanding a selection of packets by the selection means of the input buffers according to an output state of packets previously selected by the selection means in the input buffers as a whole.

According to another aspect of the present invention there is provided a packet transfer device, comprising: a buffer for temporarily storing entered packets; a control unit for controlling the buffer; and at least one output port for transferring packets outputted from the buffer; wherein the control unit has management means for managing packets stored in the buffer in terms of a plurality of groups, distribution means for distributing each packet entered at the buffer into one of said plurality of groups so that packets are distributed fairly among flows to which packets belong, and control means for commanding the buffer to output packets belonging to one of said plurality of groups managed by the management means toward the output port.

According to another aspect of the present invention there is provided a method of packet transfer in a packet transfer device formed by a plurality of input buffers for temporarily storing packets belonging to a plurality of classes, a control unit for controlling the input buffers, and at least one output port for transferring packets outputted from the input buffers, the method comprising the steps of: temporarily storing entered packets class by class at each input buffer; determining a selected class of packets to be outputted from the input buffers according to a packet storage state in the input buffers as a whole for each class, and issuing a command specifying the selected class from the control unit to the input buffers; and outputting temporarily stored packets of the selected class specified by the command of the control unit from each input buffer toward the output port.

According to another aspect of the present invention there is provided a method of packet transfer in a packet transfer device formed by a plurality of input buffers for temporarily storing packets, a control unit for controlling the input buffers, and at least one output port for transferring packets outputted from the input buffers, the method comprising the steps of: temporarily storing entered packets at each input buffer; selecting packets to be outputted from each input buffer among temporarily stored packets; issuing a command commanding a selection of packets by the selecting step from the control unit to the input buffers, according to an output state of packets previously selected by the selecting step in the input buffers as a whole; and outputting temporarily stored packets selected by the selecting step from each input buffer toward the output port.

According to another aspect of the present invention there is provided a method of packet transfer in a packet transfer device formed by a buffer for temporarily storing entered packets, a control unit for controlling the buffer, and at least one output port for transferring packets outputted from the buffer, the method comprising the steps of: managing packets stored in the buffer in terms of a plurality of groups; distributing each packet entered at the buffer into one of said plurality of groups so that packets are distributed fairly among flows to which packets belong; and outputting packets belonging to one of said plurality of groups managed by the managing step from the buffer toward the output port.

According to another aspect of the present invention there is provided a packet transfer device, comprising: at least one buffer for temporarily storing entered packets; and a control unit for controlling a packet transfer at the buffer, by issuing a packet transfer command to the buffer according to a log of packet transfer commands with respect to the buffer and a packet storage state of the buffer.

According to another aspect of the present invention there is provided a method of packet transfer in a packet transfer device formed by at least one buffer and a control unit for controlling a packet transfer at the buffer, the method comprising the steps of: temporarily storing entered packets at the buffer; and controlling a packet transfer at the buffer, by issuing a packet transfer command from the control unit to the buffer according to a log of packet transfer commands with respect to the buffer and a packet storage state of the buffer.

Other features and advantages of the present invention will become apparent from the following description taken in conjunction with the accompanying drawings.

DETAILED DESCRIPTION OF THE PREFERRED EMBODIMENTS

Now, various embodiments of a packet transfer device and a packet transfer method according to the present invention will be described with references to drawings.

0. Definitions of Terms

First, the terms used in describing various embodiments of the present invention will be defined.

(1) A Packet:

A packet is a concept which encompasses a fixed length cell, and should be understood as a generalization of a cell. In the following description, a packet can be taken as either a variable length one or a fixed length one. Also, the following description explicitly refers to a cell solely for the sake of simplifying the explanation, and the following description should not be taken to limit the scope of the present invention to just a case of using a cell.

(2) A Packet (cell) Buffer Device and a Packet (cell) Multiplexing Device:

A packet buffer device is a device which has at least one input port, at least one output port, and at least one buffer, in which a packet entered from the input port is temporarily stored in the buffer according to the need, and outputted to the output port. In particular, a packet buffer device which outputs a packet to the output port according to the destination of a packet will be referred to as a packet switch. A buffer constituting a part of a large scale packet buffer device can also be considered as a packet buffer device.

A packet multiplexing device is a kind of packet buffer device which has only one packet output port. When the output ports of a packet buffer device are considered separately, a packet buffer device can be viewed as a combination of a plurality of packet multiplexing devices with common input ports. In the following, the description directed to a packet multiplexing device is equally applicable to a packet buffer device.

A packet transfer device is a generic term encompassing both a packet buffer device and a packet multiplexing device.

It is to be noted that, in the following, the description based on a specific example of a multiplexing device or a buffer device is not just applicable to a multiplexing device or a buffer device alone, and should be considered as applicable to a packet transfer device in general.

1. Priority Control Among Classes

Now, with references to FIG. 5 to FIG. 7, the first embodiment of a packet transfer device and a packet transfer method according to the present invention will be described in detail. This first embodiment is directed to a case of a cell multiplexing device for carrying out the priority control among classes.

Figure 5:
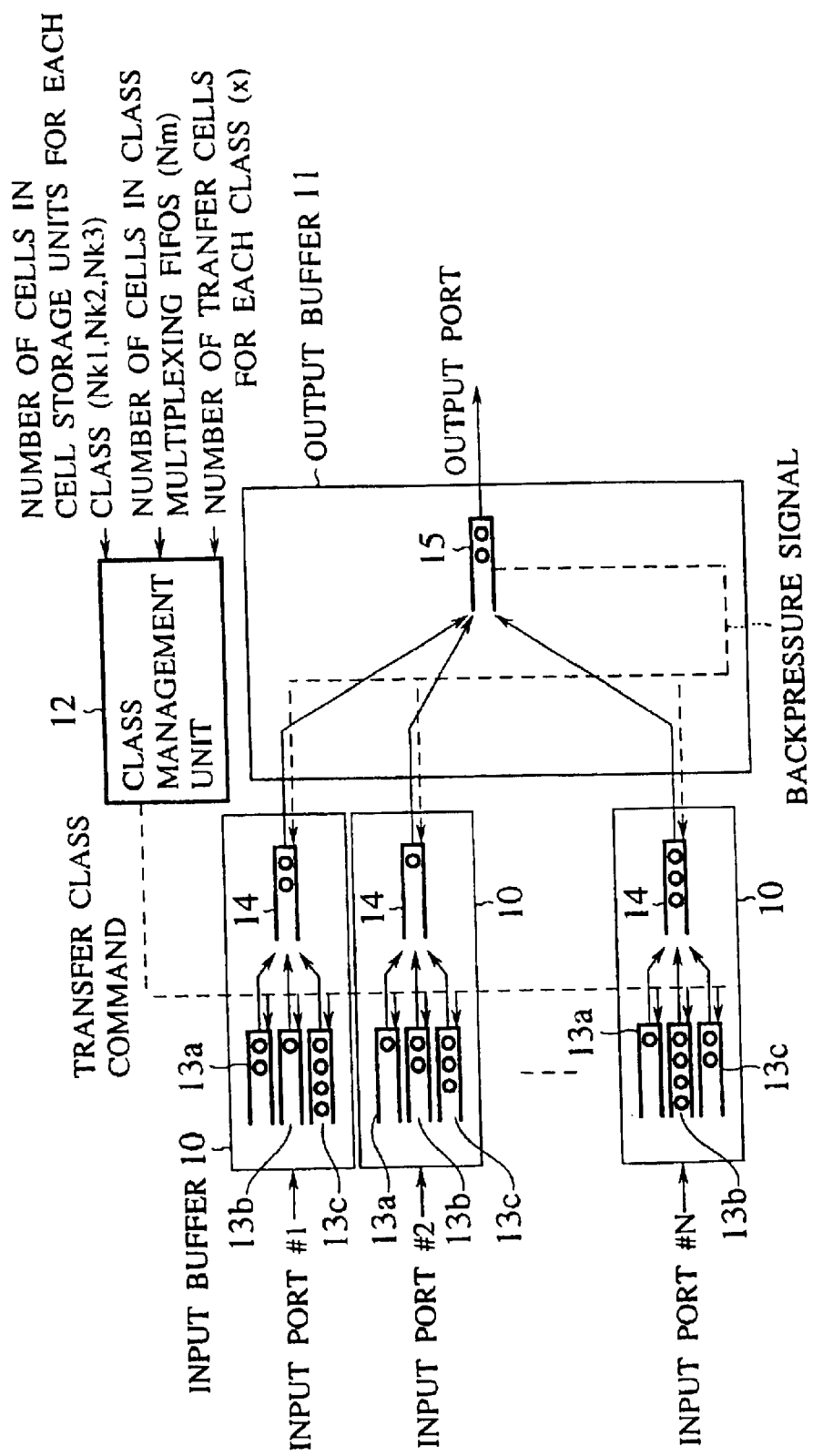
FIG. 5 is a block diagram of a cell multiplexing device for carrying out the priority control among classes according to the first embodiment of the present invention.

FIG. 5 shows an exemplary configuration of a cell multiplexing device for carrying out the priority control among classes according to this first embodiment.

The cell multiplexing device of FIG. 5 comprises: a plurality of input buffers 10, respectively provided in correspondence to a plurality of input ports #1 to #N, for temporarily storing cells entered from the respective input ports #1 to #N; an output buffer 11 for multiplexing cells outputted from the input buffers 10, and outputting multiplexed cells to an output port; and a class management unit 12 for managing all the input buffers 10.

Each input buffer 10 has a plurality of class by class cell storage units 13 (a class-1 cell storage unit 13*a*, a class-2 cell storage unit 13*b* and a class-3 cell storage unit 13*c*) for a plurality of classes (class-1, class-2 and class-3) of entered cells, and a class multiplexing FIFO 14 for multiplexing cells outputted from the cell storage units 13 and outputting the multiplexed cells to the output buffer 11.

The class management unit 12 obtains a number of cells in a cell storage unit for each class (Nk1, Nk2 and Nk3) for the cell storage units 13 of the input buffers 10 and a number of cells in class multiplexing FIFOs (Nm) for the class multiplexing FIFOs 14 of the input buffers 10, determines a transfer class command from these numbers according to a prescribed algorithm, and notifies the determined transfer class command to all the input buffers 10.

When the transfer class command is notified from the class management unit 12, the cell storage unit 13 of a class specified by the transfer class command transfers cells to the class multiplexing FIFO 14 in each input buffer 10. The class multiplexing FIFO 14 of each input buffer 10 outputs cells to the output buffer 11 under a control of a backpressure signal indicating a congestion state inside the output buffer 11.

Each class by class cell storage unit 13 can be formed by a FIFO (First In First Out) memory, for example.

Note that FIG. 5 shows an exemplary case of using three classes (class-1 to class-3), but this first embodiment is effectively operable regardless of a number of classes involved.

Also, by viewing the configuration of FIG. 5 as an output port portion of a cell switch, this first embodiment is equally applicable to a cell switch as well.

In addition, the output buffer 11 shown in FIG. 5 has a configuration formed by a single FIFO 15, but any other desired configuration can be used for this output buffer 11 as long as it is possible to guarantee that the cells of the class multiplexing FIFOs 14 can be outputted to the output port within a finite time under any conditions.

For example, it is possible to use a configuration which has no buffer at all, but which has a function to arbitrate cells from the class multiplexing FIFOs 14 at a time of outputting cells to the output port. It is also possible to use a configuration shown in FIG. 6 or FIG. 7 described below.

Figure 6:
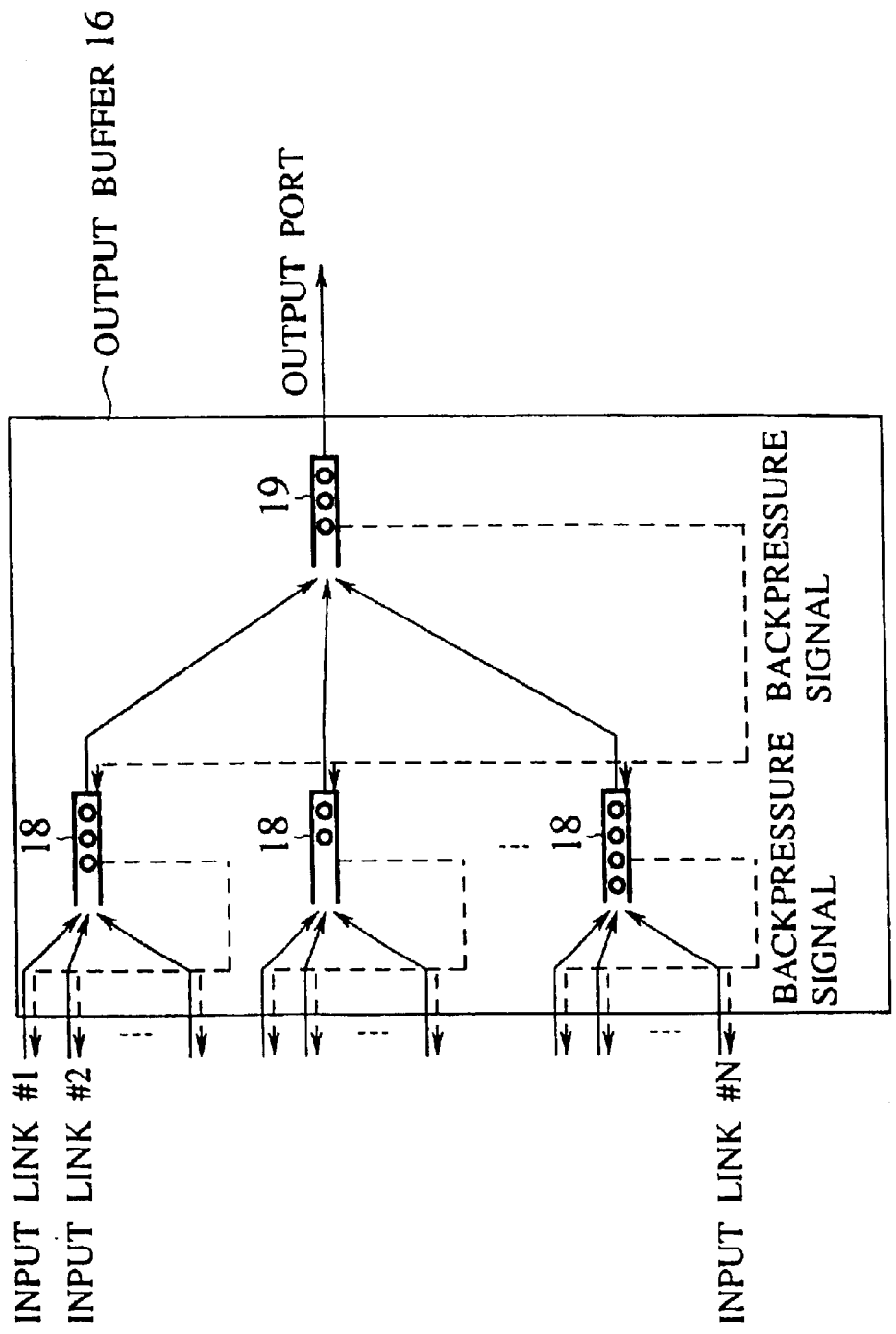
FIG. 6 is a block diagram of another possible configuration of an output buffer in the cell multiplexing device of FIG. 5.

An output buffer 16 shown in FIG. 6 has a configuration formed by FIFOs in multiple stages (two stages in FIG. 6), where each FIFO provides a backpressure signal to a FIFO of an immediately preceding stage.

Namely, in the output buffer 16 of FIG. 6, the input links #1 to #N respectively provided in correspondence to the outputs of the input buffers 10 are connected to a plurality of FIFOs 18 on an input side (front stage), and outputs of these FIFOs 18 are connected to a FIFO 19 of an output side (back stage). The backpressure signal outputted from the FIFO 19 of the back stage according to its congestion state is provided to each one of a plurality of FIFOs 18 of the front stage, and the backpressure signal outputted from each one of a plurality of FIFOs 18 of the front stage according to its congestion state is provided to a plurality of class multiplexing FIFOs 14 of the input buffers 10 connected thereto.

Figure 7:
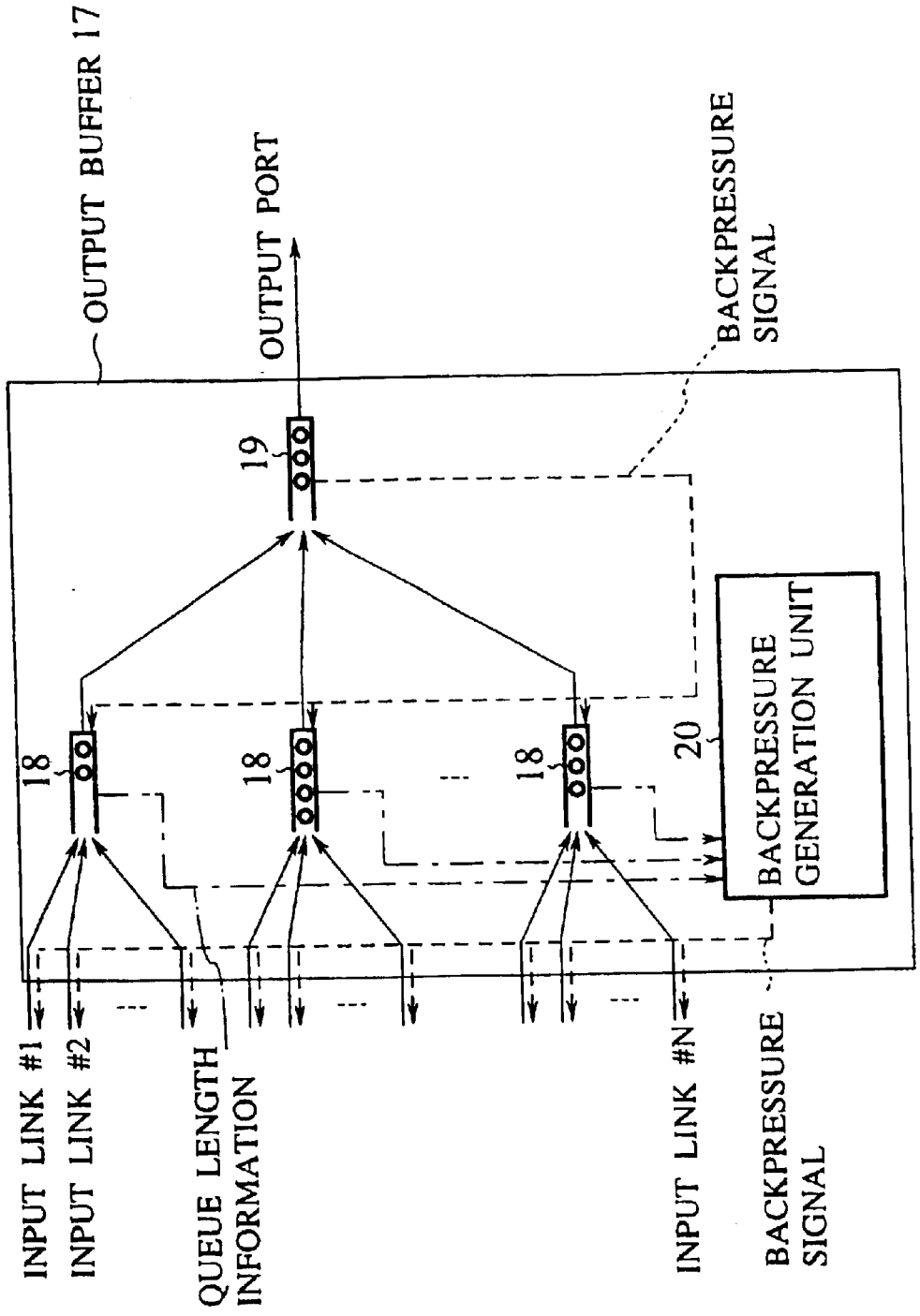
FIG. 7 is a block diagram of still another possible configuration of an output buffer in the cell multiplexing device of FIG. 5.

On the other hand, an output buffer 17 shown in FIG. 7 has a configuration formed by FIFOs in multiple stages (two stages in FIG. 7) similarly as the output buffer 16 of FIG. 6, but differs from the output buffer 16 of FIG. 6 in that a queue length information of a plurality of FIFOs 18 of the input side (or a queue length information of all FIFOs) is transferred to a backpressure generation unit 20, and this backpressure generation unit 20 generates a backpressure signal from the queue length information and notifies the generated backpressure signal to all the input links.

For example, a total sum of all queue lengths is compared with a threshold value, and when the total sum of all queue lengths exceeds the threshold value, an input into the output buffer 17 is prohibited by the backpressure signal. Note that the backpressure generation unit 20 may be provided inside the class management unit 12 instead of being provided inside the output buffer 17 as shown in FIG. 7.

According to the cell multiplexing device for carrying out the priority control among classes in this first embodiment, there is no need to distinguish classes at the output buffer which requires a high throughput, so that the realization of the cell multiplexing device becomes easier. Here, there is a need for the input buffers to manage cells class by class, but the input buffer only requires a low throughput, so that the easy realization of the cell multiplexing device is still possible.

Now, the configuration of the cell multiplexing device of FIG. 5 will be described in further detail.

A number of cells in cell storage units for each class which is entered into the class management unit 12 can be a total sum of numbers of cells in the cell storage units for each class at all the input buffers 10. Similarly, a number of cells in class multiplexing FIFOs which is entered into the class management unit 12 can be a total sum of numbers of cells in the class multiplexing FIFOs at all the input buffers 10. Here, a calculation of a total sum may be carried out either inside or outside the class management unit 12.

The number of cells information is then compared with a relatively small threshold value in the class management unit 12. This threshold value can be given as a fixed value or a dynamically variable value depending on the algorithm used in the class management unit 12. In a case of using the threshold value given as a fixed value, it is also possible to enter a comparison result into the class management unit 12, instead of the number of cells information.

Also, when values greater than a certain value have no effect on the processing of the class management unit 12, this fact can be utilized to encode values by assigning one code for all these values greater than a certain value. For instance, the encoding using 4 bits can be applied to values of a number of cells by setting (0000)=0, (0001)=1, (0010)=2, (0011)=3, . . . , (1101)=13, (1110)=14, and (1111)=any number greater than or equal to 15. When such an encoding is used, there is an advantage in that the input information entered into the class management unit 12 can be compressed, and therefore the implementation of the class management unit 12 becomes simpler.

By dealing with a total sum of numbers of cells in this manner, it is possible to simplify the implementation of the class management unit 12. Note here that the same transfer class command is to be notified to all the input buffers 10, so that there is no need for the class management unit 12 to recognize the individual input buffer 10. Consequently, there is an advantage in that complexity associated with the implementation of the cell multiplexing device is unchanged even when a number of input ports is increased.

As for the algorithm to be used in the class management unit 12 in order to determine the transfer class command, the following algorithm can be used, for example.

(1) Whether an underflow is caused in the class multiplexing FIFO or not is judged according to a number of cells in class multiplexing FIFOs, and only when it is judged that there is a possibility for an underflow to be caused, the transfer class command for preventing that underflow is issued. Here, the underflow refers to a state in which a number of cells in the class multiplexing FIFO becomes zero so that cells of the class by class cell storage unit that should normally be outputted cannot be outputted effectively.

(2) Classes for which the cells are stored in the input buffers 10 are selected as candidates for the transfer class command according to a number of cells in cell storage units for each class.

(3) When a transfer class command can be issued, a class with the highest priority level among the classes which are candidates for the transfer class command is determined, and the transfer class command for this class is issued.

The class management unit 12 can issue the transfer class command without directly accounting for a state of the output buffer 11 and the backpressure signal. For this reason, there are cases in which the cell transfer throughput specified by the transfer class command exceeds the cell output throughput of cells from the input buffers 10, and the class multiplexing FIFO 14 is provided in order to temporarily absorb this difference. By learning a number of cells in class multiplexing FIFOs, the class management unit 12 carries out a control so that the cell transfer throughput specified by the transfer class command does not exceed the cell output throughput of cells from the input buffers 10 for a long time continuously.

Also, by learning a number of transferred cells for each class (x), that is, a total number of cells which are actually transferred from the class by class cell storage units 13 to the class multiplexing FIFOs 14 at all the input buffers 10, the class management unit 12 can carry out more minute priority control among classes.

In this case, for the algorithm to be used in the class management unit 12 in order to determine the transfer class command, the following algorithm can be used, for example.

(1) Whether an underflow is caused in the class multiplexing FIFO or not is judged according to a number of cells in class multiplexing FIFOs, and only when it is judged that there is a possibility for an underflow to be caused, the transfer class command for preventing that underflow is issued. Here, the underflow refers to a state in which a number of cells in the class multiplexing FIFO becomes zero so that cells of the class by class cell storage unit that should normally be outputted cannot be outputted effectively.

(2) Classes for which the cells are stored in the input buffers 10 are selected as candidates for the transfer class command according to a number of cells in cell storage units for each class.

(3) A class which has a throughput higher than a prescribed throughput of that class according to a number of transferred cells for each class is determined, and a priority level for issuing the transfer class command for that class is lowered according to how high the current throughput is, or this class is removed from the candidates for the transfer class command.

(4) A class which has a throughput lower than a prescribed throughput of that class according to a number of transferred cells for each class is determined, and a priority level for issuing the transfer class command for that class is raised according to how low the current throughput is.

(5) When a transfer class command can be issued, a class with the highest priority level among the classes which are candidates for the transfer class command is determined, and the transfer class command for this class is issued.

As described, according to the cell multiplexing device for carrying out the priority control among classes in this first embodiment, there is no need to distinguish classes at the output buffer which requires a high throughput, so that the realization of the cell multiplexing device becomes easier even when a number of input ports is large.

2. Fair Queueing

Next, with reference to FIG. 8, the second embodiment of a packet transfer device and a packet transfer method according to the present invention will be described in detail. This second embodiment is directed to a case of a cell multiplexing device for carrying out the per-VC fair queueing, by using a concept of "basket" (or "kago" in Japanese).

Figure 8:
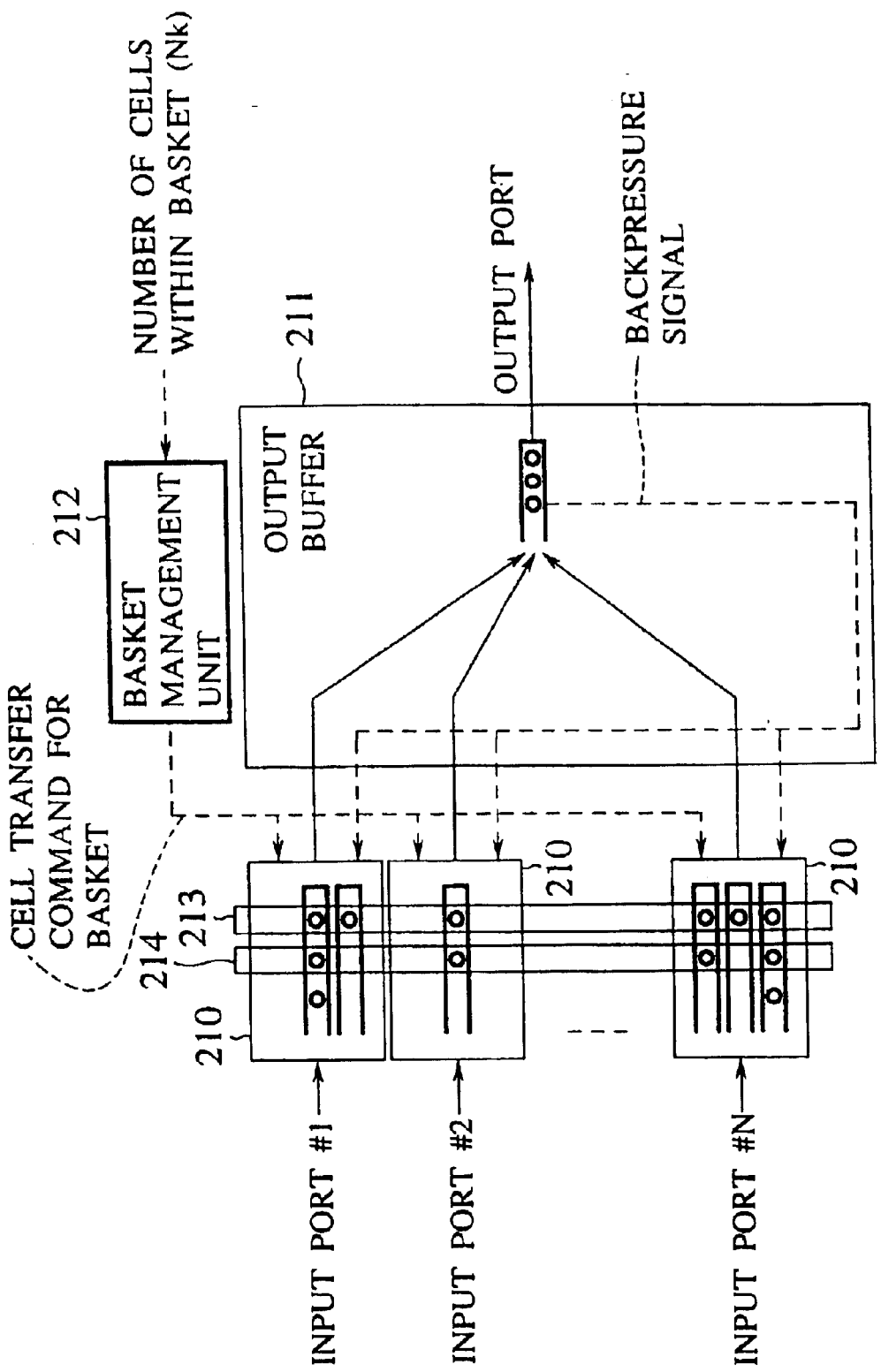
FIG. 8 is a block diagram of a cell multiplexing device for carrying out the per-VC fair queueing according to the second embodiment of the present invention.

FIG. 8 shows an exemplary configuration of a cell multiplexing device for carrying out the per-VC fair queueing according to this second embodiment.

The cell multiplexing device of FIG. 8 comprises: a plurality of input buffers 210, respectively provided in correspondence to a plurality of input ports #1 to #N, for a temporarily storing cells entered from the respective input ports #1 to #N; and an output buffer 211 for multiplexing cells outputted from the input buffers 210, and outputting multiplexed cells to an output port, where the output cells of the input buffers 210 are controlled by the backpressure signal according to the congestion state in the output buffer 211.

In addition, this cell multiplexing device of FIG. 8 has a basket management unit 212 for managing an output permitted cell set. In this second embodiment, among the cells stored in the input buffers 210, a set of cells which are permitted to be outputted (output permitted cell set) will be referred to as a basket. The input buffers 210 select the output cells from the basket 213.

The basket management unit 212 receives a number of cells contained in the basket 213 as a number of cells within basket (Nk), determines a cell transfer command for the basket 213 from this number according to a prescribed algorithm, and notifies the determined cell transfer command to all the input buffers 210.

According to the cell transfer command, the input buffers 210 adds cells of a next cell set 214 to the basket 213, where the next cell set 214 contains cells to be outputted by the identical time among the cells stored in the input buffers 210 other than those cells which are ascertained to be within the basket 213.

By viewing the configuration of FIG. 8 as an output port portion of a cell switch, this second embodiment is equally applicable to a cell switch as well.

In addition, the output buffer 211 shown in FIG. 8 may have any desired configuration as long as it is possible to guarantee that the cells in the basket 213 can be outputted to the output port within a finite time under any conditions.

For example, it is possible to use a configuration which has no buffer at all, but which has a function to arbitrate cells in the basket 213 at a time of outputting cells to the output port. It is also possible to use a configuration shown in FIG. 6 or FIG. 7 described above.

Note that, in a case of a configuration of FIG. 7, the backpressure generation unit 20 may be provided inside the basket management unit 212 instead of being provided inside the output buffer 17 as shown in FIG. 7.

According to the cell multiplexing device for carrying out the per-VC fair queueing in this second embodiment, the output buffer which requires a high throughput has a simple configuration, so that the realization of the cell multiplexing device becomes easier. Here, there is a need for the input buffers to manage cells by using a basket, but the input buffer only requires a low throughput, so that the easy realization of the cell multiplexing device is still possible.

Now, the configuration of the cell multiplexing device of FIG. 8 will be described in further detail.

A number of cells within basket which is entered into the basket management unit 212 can be a total sum of numbers of cells within the basket 213 at all the input buffers 210. Here, a calculation of a total sum may be carried out either inside or outside the basket management unit 212.

The number of cells information is then compared with a relatively small threshold value in the class management unit 12. Whether this threshold value is given as a fixed value or a dynamically variable value depends on the algorithm used in the basket management unit 212. In a case of using the threshold value given as a fixed value, it is also possible to enter a comparison result into the basket management unit 212, instead of the number of cells information.

Also, when values greater than a certain value have no effect on the processing of the basket-management unit 212, this fact can be utilized to encode values by assigning one code for all these values greater than a certain value. For instance, the encoding using 4 bits can be applied to values of a number of cells by setting (0000)=1, (0001)=1, (0010)=2, (0011)=3, . . . , (1101)=13, (1110)=14, and (1111)=any number greater than or equal to 15. When such an encoding is used, there is an advantage in that the input information entered into the basket management unit 212 can be compressed, and therefore the implementation of the basket management unit 212 becomes simpler.

By dealing with a total sum of numbers of cells in this manner, it is possible to simplify the implementation of the basket management unit 212. Note here that the same cell transfer command for basket is to be notified to all the input buffers 210, so that there is no need for the basket management unit 212 to recognize the individual input buffer 210. Consequently, there is an advantage in that complexity associated with the implementation of the cell multiplexing device is unchanged even when a number of input ports is increased.

As for the algorithm to be used in the basket management unit 212 in order to determine the cell transfer command for basket, the following algorithm can be used, for example.

Namely, whether an underflow is caused for cells within the basket 213 or not is judged according to a number of cells within basket Nk, and only when it is judged that there is a possibility for an underflow to be caused, the cell transfer command for preventing that underflow is issued. Here, the underflow refers to a state in which a number of cells within the basket 213 becomes zero so that cells of the input buffers 210 that should normally be outputted cannot be outputted effectively.

In response to the cell transfer command for the basket 213, the input buffers 210 adds cells of the next cell set 214 to the basket 213. For example, in a case of carrying out the per-VC fair queueing which are weighted by a weight Nx set up for each VC, the next cell set 214 contains cells to be outputted by the identical time, which are Nx pieces of oldest cells for each VC among the cells stored in each input buffer 210 other than those cells which are within the basket 213.

The same cell transfer command is notified to all the input buffers 210, so that cells are entered into the basket 213 fairly among VCs through a plurality of input buffers 210.

By transferring cells within the basket 213 with priority over cells outside the basket 213, it is possible to transfer cells to the output buffer 211 fairly among VCs through a plurality of input buffers 210.

When the output buffer 211 has a configuration in which it is possible to output cells entered from the basket 213 within a certain time under any conditions, cells transferred to the basket 213 fairly among VCs will be outputted from the output port with a delay jitter equal to that certain time.

FIG. 8 shows an exemplary state in which two VCs, one VC and three VCs are queued into the input buffers 210 for the input ports #1, #2 and #N, respectively. When the weights of all VCs are equal, by carrying out the per-VC fair queueing, the outputs from the input buffers 210 for the input ports #1, #2 and #N must have a ratio of 2:1:3 in this case. In the cell multiplexing device of this second embodiment, by means of the cell transfer command for the basket 213 which is notified to all the input buffers 210 from the basket management unit 212, cells within the basket 213 have a ratio of 2:1:3 among the input buffers 210 for the input ports #1, #2 and #N, so that eventually the outputs from the output buffer 211 also have a ration of 2:1:3.

As for a method for entering cells into the basket 213, the following two methods are available.

One method is a method in which cells entered into the input buffers 210 are not entered into the basket 213 immediately even when a condition for entering cells into the basket 213 is satisfied. In this method, cells are transferred to the basket 213 only when the cell transfer command is issued from the basket management unit 212. By this method, a number of cells within basket decreases except when the the basket management unit 212 issues the cell transfer command.

Another method is a method in which cells entered into the input buffers 210 are entered into the basket 213 immediately whenever a condition for entering cells into the basket 213 is satisfied. Namely, a VC which transferred Nx pieces of cells to the basket 213 at a timing of the cell transfer command cannot enter cells into the basket 213 until a next cell transfer command is issued, whereas a VC which did not transfer cells to the basket 213 or a VC which transferred only less than Nx pieces of cells to the basket 213 at a timing of the cell transfer command can enter cells into the basket 213 up to Nx pieces of cells in total even when the cell transfer command is not issued. By this method, a number of cells within basket may increase during a period between one cell transfer command and another cell transfer command, but will be reduced at a stage where nearly all active VCs transferred Nx pieces of cells.

Note that this second embodiment can be operated effectively by using either one of these two methods for entering cells into the basket 213.

A congestion state in the cell multiplexing device of this second embodiment can be judged by monitoring an information which varies in accordance with the traffic for each VC in a prescribed manner. Then, according to this congestion state judgement, the traffic control information for each VC can be notified to the terminals.

Here, the variable information to be monitored may include a number of stored cells, a number of input cells per unit time and its relationship with its target value, or a time required for entering a prescribed number of cells and its relationship with its target value, for example. A VC to be judged as congested is a VC for which a number of stored cells is large, a VC for which a number of input cells per unit time is much larger than its target value, or a VC for which a time required for entering a prescribed number of cells is much shorter than its target value.

The traffic control information can be notified to the terminals by marking the EFCI provided in a header of a cell in the VC which is congested, or by rewriting an RM cell which is passing through.

As described, according to the cell multiplexing device for carrying out the per-VC fair queueing in this second embodiment, the output throughput of each input buffer is adjusted by controlling cells entered into the output permitted cell set called basket, so that the per-VC fair queueing can be realized, and it becomes possible to realize the robustness in the ABR service and the fairness in the UBR service.

3. Cell Buffer Device Using Cell Group FIFO

Next, with reference to FIG. 9 to FIG. 11, the third embodiment of a packet transfer device and a packet transfer method according to the present invention will be described in detail. This third embodiment is directed to a case of a cell buffer device for carrying out the per-VC fair queueing, by using cell group FIFO.

Figure 9:
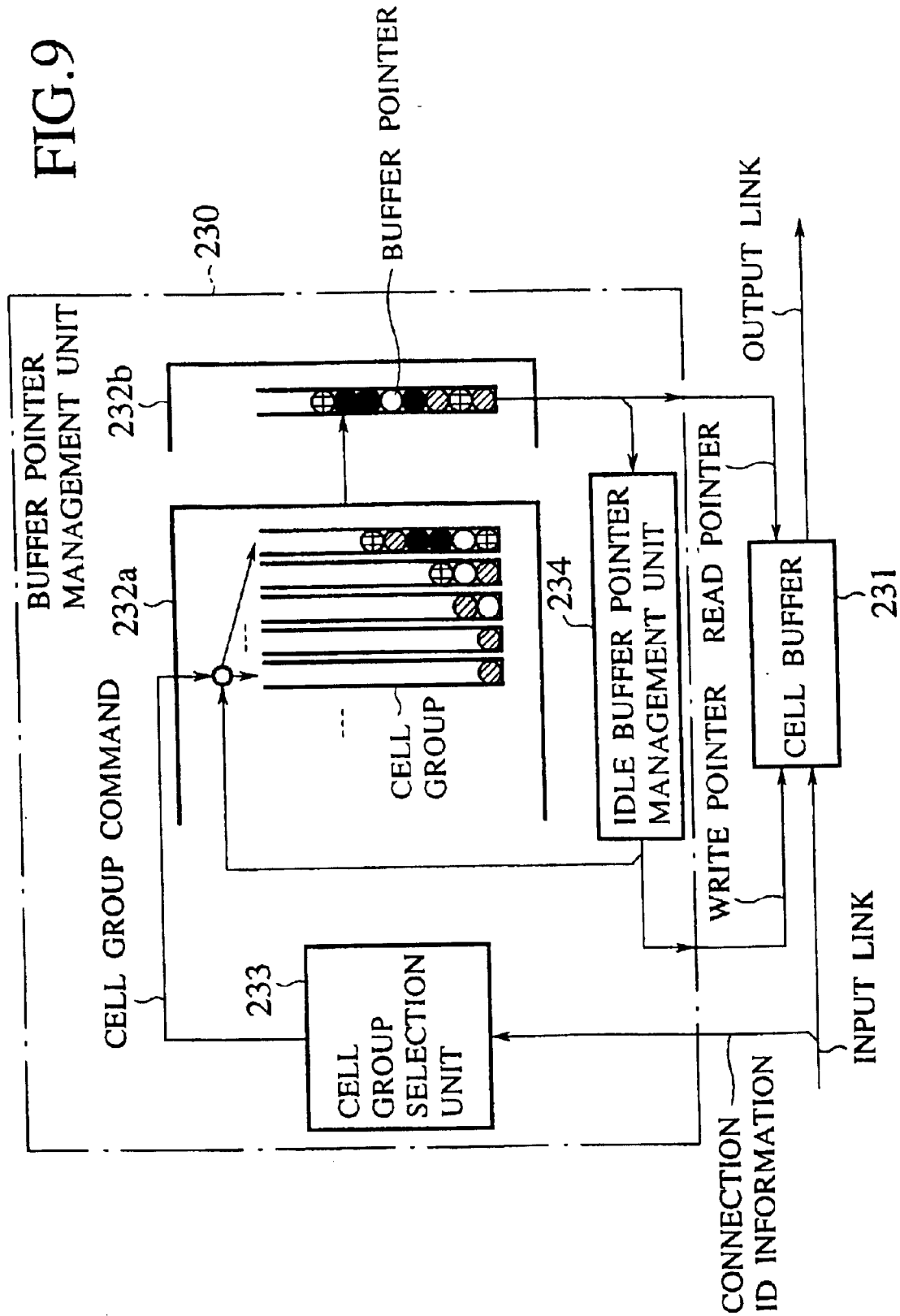
FIG. 9 is a block diagram of a cell buffer device for carrying out the per-VC fair queueing according to the third embodiment of the present invention.

FIG. 9 shows an exemplary configuration of a cell buffer device for carrying out the per-VC fair queueing according to this third embodiment.

In the cell buffer device of FIG. 9, a connection ID information of a cell entered from an input link is notified to a buffer pointer management unit 230, a cell is temporarily stored in a cell buffer 231 according to a write pointer indicating a writing position of a cell which is obtained from the buffer pointer management unit 230, a cell is read out from the cell buffer 231 according to a read pointer indicating a cell to be read out which is obtained from the buffer pointer management unit 230, and a read out cell is outputted to an output link.

The buffer pointer management unit 230 manages buffer pointers indicating positions of stored cells on the cell buffer 231. This buffer management unit 230 includes: a cell group FIFO 232a for managing a plurality of cell groups, each of which is a set of buffer pointers, in a FIFO manner; an output waiting cell group FIFO 232b, a cell group selection unit 233, and an idle buffer pointer management unit 234.

At a time of cell input, in the buffer pointer management unit 230, idle buffer pointers are obtained from the idle buffer pointer management unit 234 and set as the write pointers, while the cell group selection unit 233 issues a cell group command for commanding the cell group FIFO 232a to enter as many buffer pointers as determined according to a weight prescribed for each VC, sequentially from a head cell group in the cell group FIFO 232a. In response, the cell group FIFO 232a enters the write pointers into the specified cell groups according to the cell group command.

At a time of cell output, a cell group is outputted from a head of the cell group FIFO 232a if required, and buffer pointers contained in those cell groups are outputted and set as read pointers, while these read pointers are returned to the idle buffer pointer management unit 234.

FIG. 9 shows a configuration suitable for a case in which there is a possibility for having more than one cell groups which are awaiting for output. These cell groups which are outputted from the cell group FIFO 232a are entered into the output waiting cell group FIFO 232b.

The cell group in the output waiting cell group FIFO 232b is a cell group which is permitted to be outputted by some external management unit of the cell buffer 231. For example, this cell group can be corresponding to the basket 213 shown in FIG. 8 for the second embodiment described above.

The read pointers are buffer pointers which are outputted from a head cell group of the output waiting cell group FIFO 232b.

For example, suppose that the weights of all VCs are equal. Cells in a head cell group of the cell group FIFO 232a are head cells of queues for the respective VCs (excluding cells in the output waiting cell group FIFO 232b). Cells in the second cell group from a head in the cell group FIFO 232a are second cells of queues for the respective VCs, and so on for the third and subsequent cell groups. In a case of outputting these cells, cells are outputted sequentially from the head cell group of the cell group FIFO 232a so that cells are going to be outputted fairly among VCs.

When cells of a new VC are arriving at this cell buffer device, these cells are entered into a head cell group of the cell group FIFO 232a, and outputted with priority over the second and subsequent cells of queues for the other VCs.

Figure 1:
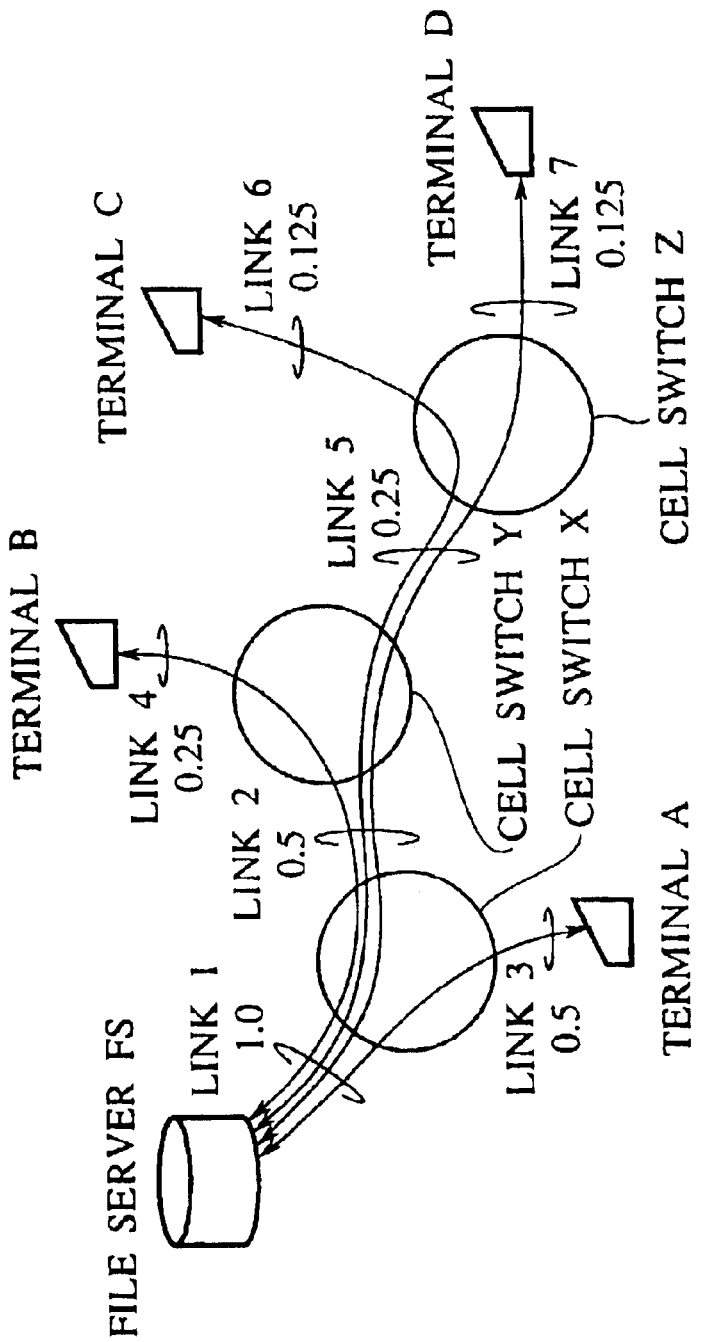
FIG. 1 is a schematic diagram of a conventional network system illustrating an example of unfair bandwidth allocation in the UBR service.
Figure 2:
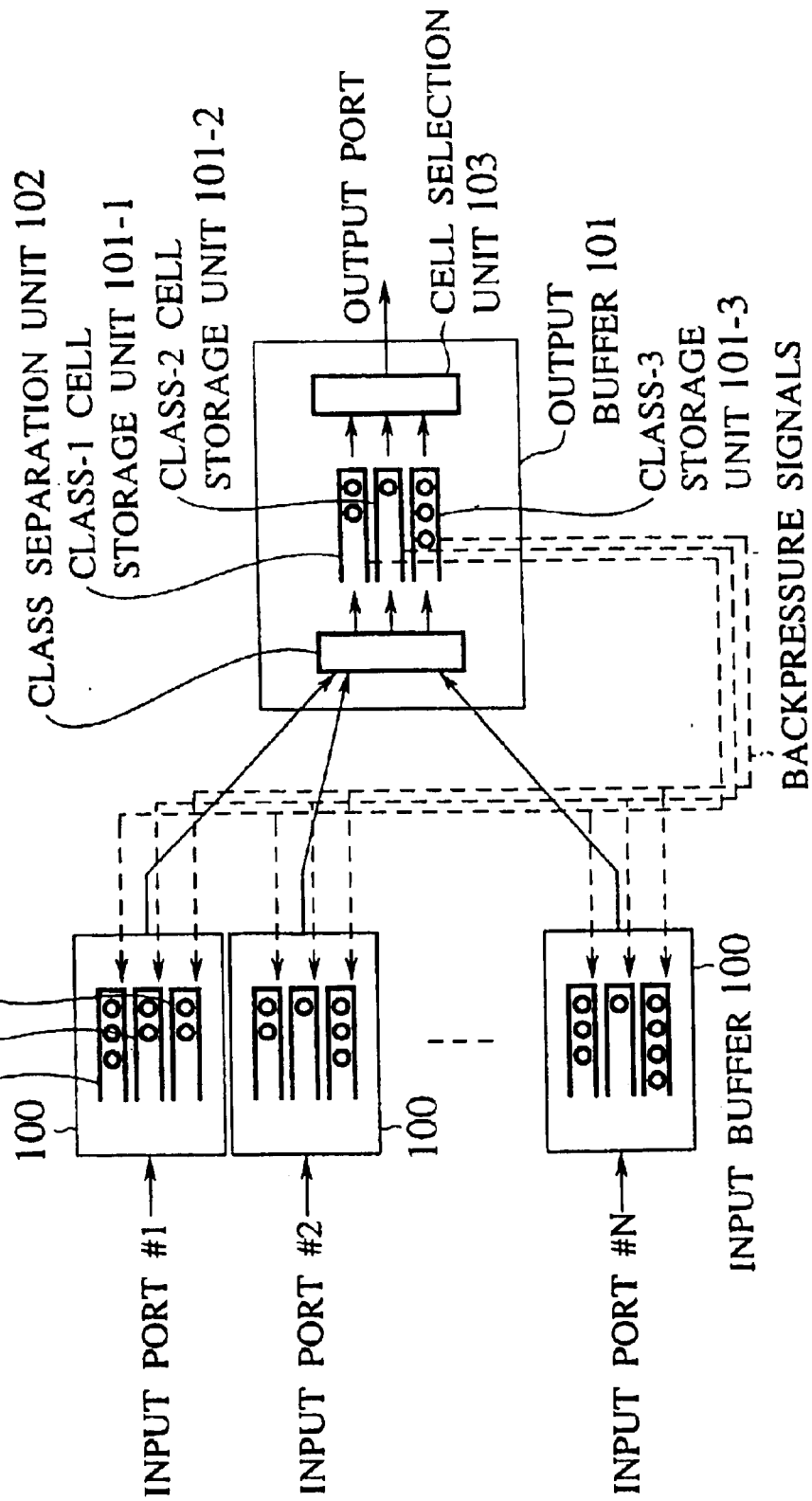
FIG. 2 is a schematic block diagram of a conventional cell multiplexing device for carrying out the priority control among classes.
Figure 3:
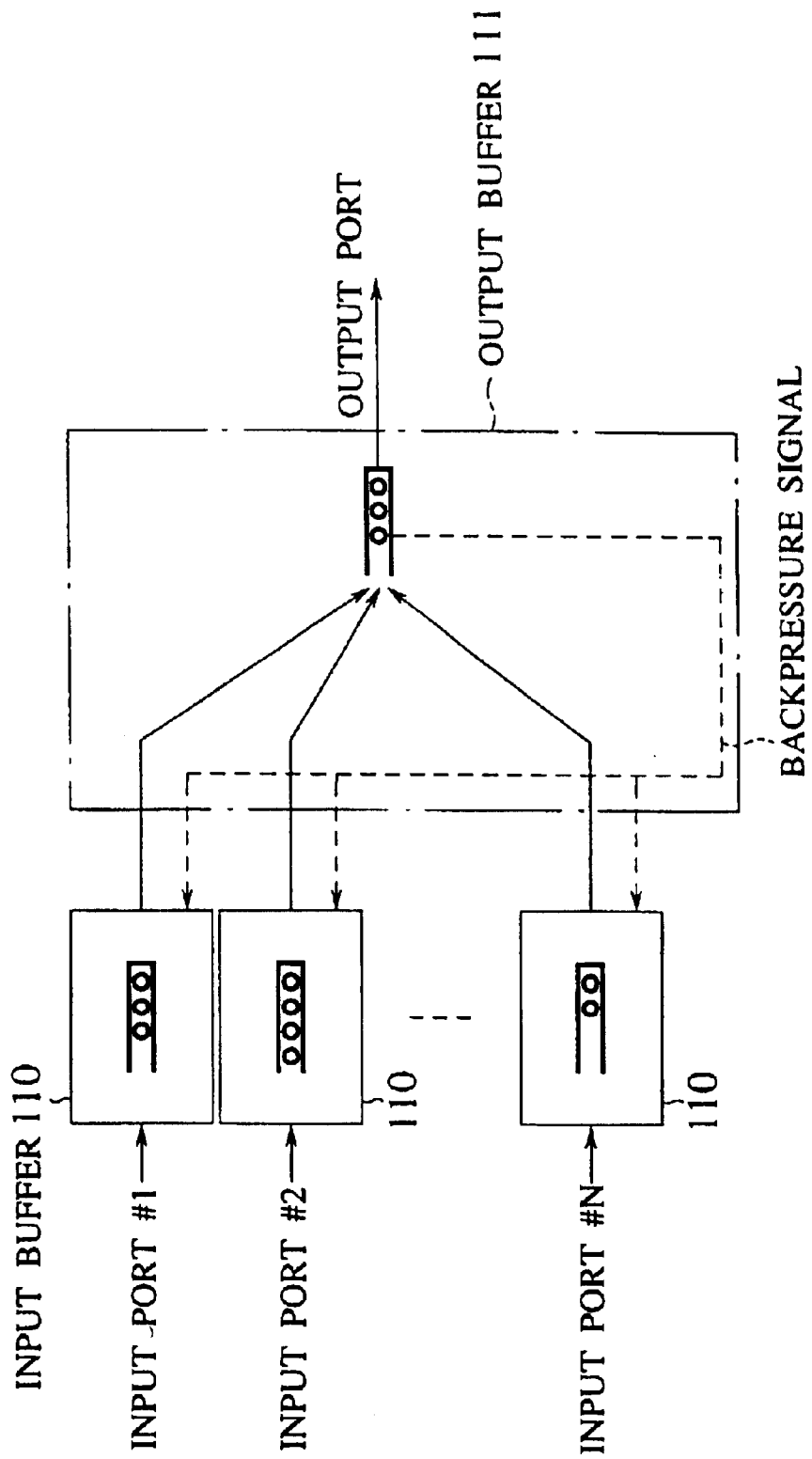
FIG. 3 is a schematic block diagram of a conventional cell multiplexing device.
Figure 4:
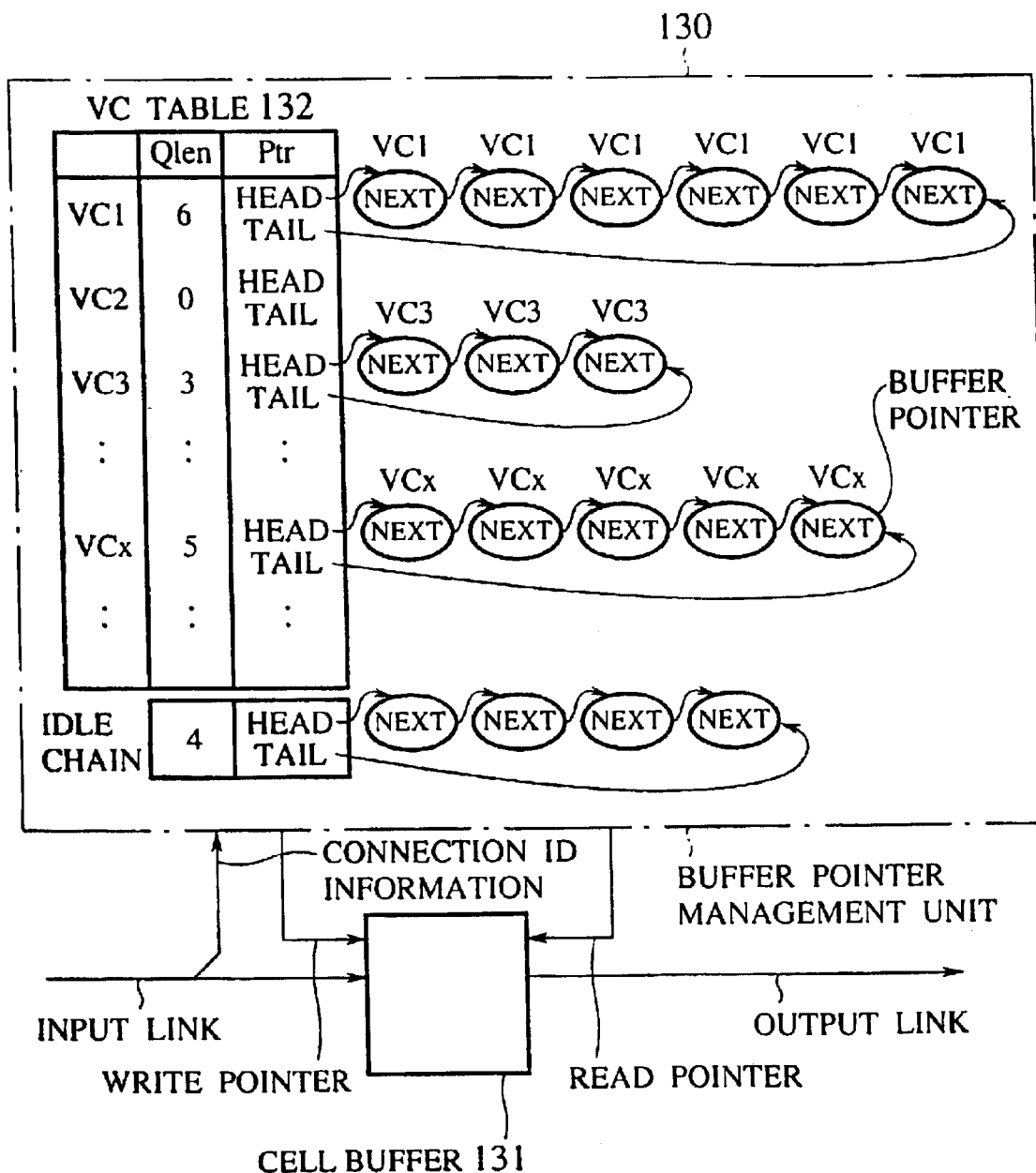
FIG. 4 is a schematic block diagram of a conventional FIFO for realizing the per-VC fair queueing.

In this manner, according to the cell buffer device of this third embodiment, it is possible to carry out the per-VC fair queueing while there is no need to carry out the search operation which is required in the prior art device of FIG. 4 at a time of cell input or cell output.

The cell group FIFO 232a of this cell buffer device of the third embodiment can be realized by a pointer chain scheme or a ring buffer scheme, for example.

Next, the data structure used in the cell buffer device of FIG. 9 in this third embodiment will be described.

Figure 10:
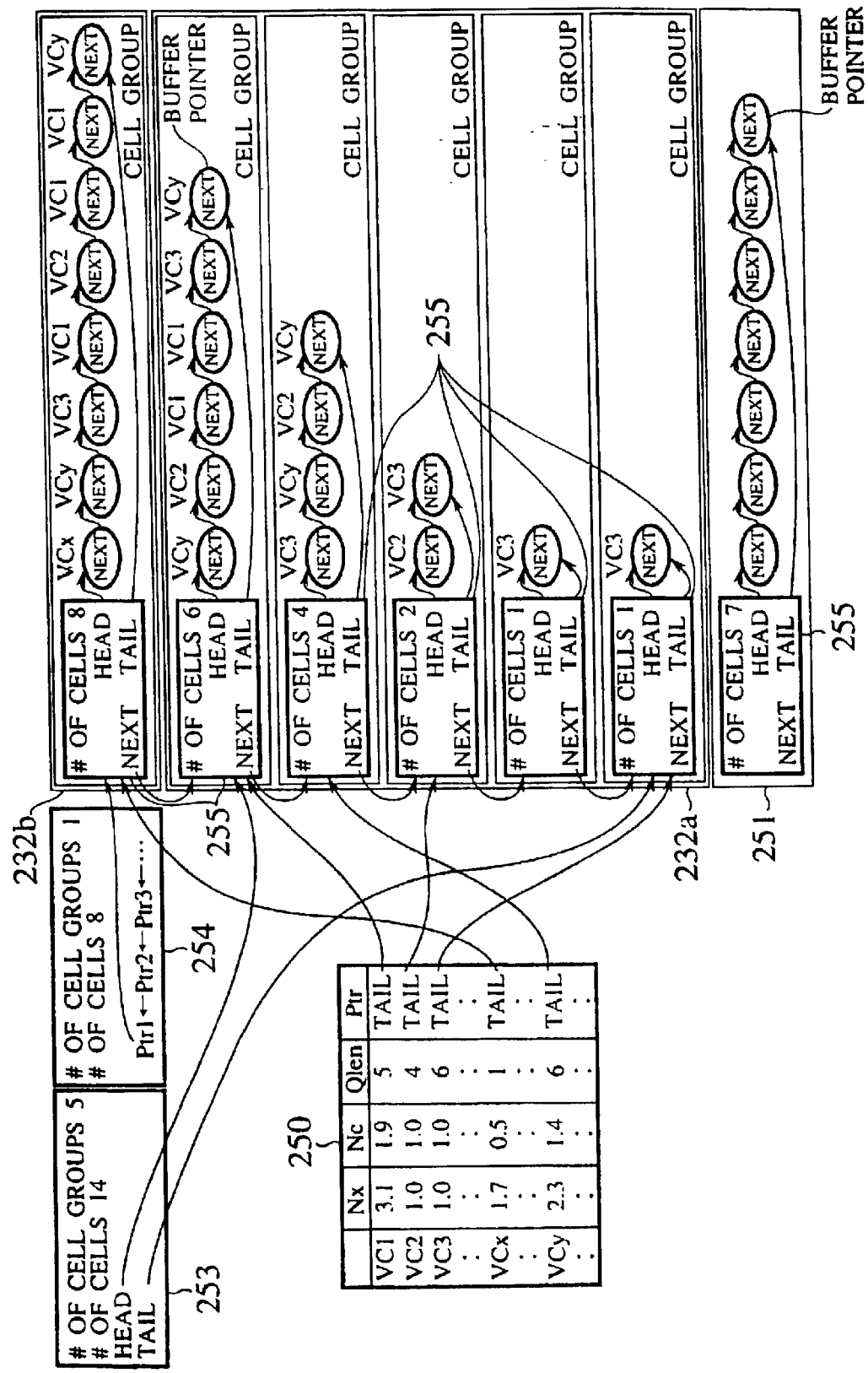
FIG. 10 is a diagram showing one part of exemplary data structure to be used in the cell buffer device of FIG. 9.
Figure 11:
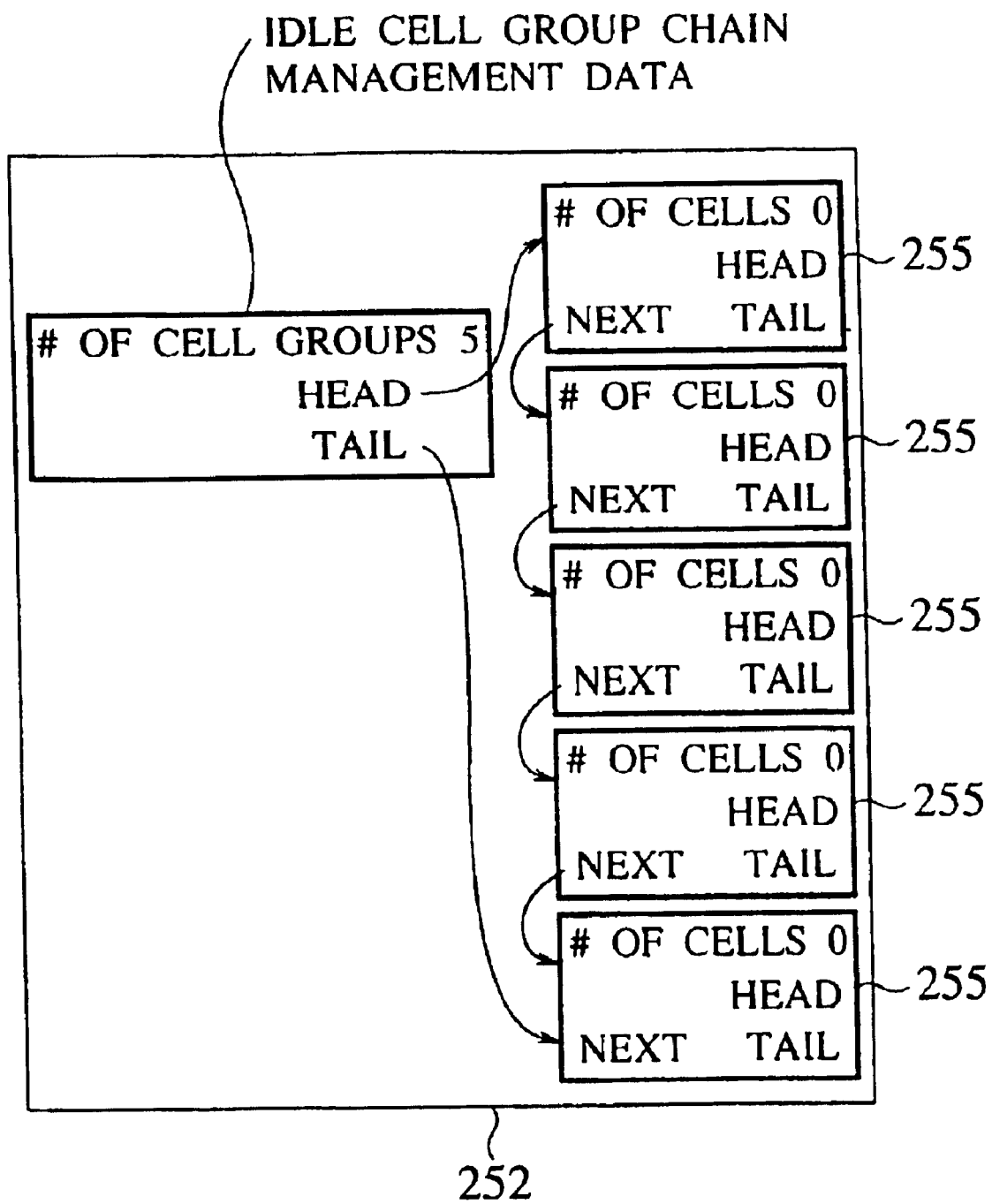
FIG. 11 is a diagram showing another part of exemplary data structure to be used in the cell buffer device of FIG. 9.

FIG. 10 and FIG. 11 show an exemplary data structure for realizing the cell buffer device of FIG. 9 by using the pointer chain scheme.

This data structure generally comprises a VC table 250, the cell group FIFO 232a, the output waiting cell group FIFO 232b, and an idle buffer pointer chain 251 as shown in FIG. 10, and an idle cell group chain 252 as shown in FIG. 11.

In addition, a cell group FIFO management data 253 for managing the cell group FIFO 232a, and an output waiting cell group FIFO management data 254 for managing the output waiting cell group FIFO 232b are provided.

Each one of the cell groups and the idle buffer pointer chain 251 is provided in a form of a chain of buffer pointers, while each of the cell group FIFO 232a and the idle cell group chain 252 is provided in a form of a chain of cell group management data 255.

For the output waiting cell group FIFO 232b, a list of pointers (Ptr1, Ptr2, Ptr3, etc.) for pointing the cell groups is provided in the output waiting cell group FIFO management data 254.

Note that it is also possible to provide the cell group FIFO 232a and the output waiting cell group FIFO 232b by the ring buffer scheme.

When cells are entered, it is necessary to determine the cell group into which the write pointers for a VC taken out from the idle buffer pointer chain 251 are to be entered. To this end, a region in the VC table 250 corresponding to that VC is read out first. In the VC table 250, Nx indicates a weight of each VC, Nc indicates a working variable for each VC, Qlen indicates a number of stored cells for each VC, and Ptr indicates a pointer to the cell group in which the tail cell of each VC is stored.

First, Qlen is checked to see whether cells of that VC are currently stored in the cell buffer device or not. When Qlen is equal to zero, the write pointers for that VC are entered into the head cell group of the cell group FIFO 232a. Even when Qlen is greater than or equal to 1, as long as Ptr is pointing to the cell group in the output waiting cell group FIFO 232b, the write pointers for that VC are entered into the head cell group of the cell group FIFO 232a.

Otherwise, Nc is updated to Nc+1.0, and the updated Nc is compared with Nx. When Nx is greater than or equal to the updated Nc, the write pointers for that VC are entered into a cell group pointed by Ptr. When Nx is less than the updated Nc, the write pointers for that VC are entered into a cell group next to a cell group pointed by Ptr.

Here, a procedure for updating Nc when a cell is entered is as follows. As described above, in a case of entering the buffer pointers for that VC into the head cell group of the cell group FIFO 232a for the first time, Nc is set as Nc:=1.0. Otherwise, Nc is updated as Nc:=Nc+1.0. As a result of this updating, if Nx≧Nc, the buffer pointers are entered into that cell group, whereas if Nx<Nc, the buffer pointers are entered into a next cell group in the cell group FIFO 232a while Nc is further rewritten as Nc:=Nc−Nx (so that 0<Nc≦Nx).

When it becomes necessary to enter the buffer pointers into a next cell group of the last cell group in the cell group FIFO 232a, the cell group management data 255 is taken out from a head of the idle cell group chain 252 and entered at a tail of the cell group FIFO 232a, and then the buffer pointers are entered into that cell group.

The output waiting cell group FIFO management data 254 has pointers Ptr1, Ptr2, Ptr3, etc. for pointing the cells groups in a form of a shift register. The FIFO of the cell group pointed by Ptr1 is at a head, and the buffer pointers outputted from this cell group are set as the read pointers. The read pointers are then entered at a tail of the idle buffer pointer chain 251. When the buffer pointers for the cell group pointed by Ptr1 become empty, that cell group is entered at a tail of the idle cell group chain 252. Then, for all n for which n≧2, Ptr(n) is shifted to Ptr(n−1), while the buffer pointers are outputted from the cell group which is pointed by a new Ptr1.

As described above, when a cell is entered, it is necessary to judge whether Ptr of the VC table 250 is pointing to the output waiting cell group or not. Consequently, it is necessary for the output waiting cell group FIFO management data 254 to have a structure on which the search can be carried out easily.

In a case of newly transferring the cell group from the cell group FIFO 232a to the output waiting cell group FIFO 232b, a number of cell groups in the output waiting cell group FIFO management data 254 is incremented to m, and Ptr(m) is set to point to the cell group outputted from the cell group FIFO 232a.

Note that, the cell buffer device of this third embodiment is also easily applicable to an input buffer using a concept of basket in FIG. 8 for the second embodiment described above. In such a case, the output waiting cell group FIFO 232b corresponds to the basket.

As described, according to the cell buffer device for carrying out the per-VC fair queueing in this third embodiment, there is no need to carry out a processing to search through the VC table, and therefore the cell buffer device can be realized easily without being affected by an upper limit of a number of VCs that can be set up.

4. Weighted Per-flow Fair Queueing

Next, with reference to FIG. 12 and FIG. 13, the fourth embodiment of a packet transfer device and a packet transfer method according to the present invention will be described in detail. This fourth embodiment is directed to a case of a packet buffer device for carrying out the per-flow fair queueing.

In the above, the cell buffer device for carrying out the per-VC fair queueing has been described for a case of handling cells which are fixed length packets. In a case of a packet buffer device which is capable of handling packets of different lengths simultaneously, it is also possible to output the entered packets fairly according to the weights set up for different flows as follows.

Here, the flows are sets of packets which are identified by certain criteria, which include the following examples.

Flows as used in the IP network (which are identified by a transmission source address, a transmission source port, a destination address, and a destination port), or VCCs or VPCs as used in the ATM network.

Different service classes (guaranteed, controlled-load, best-effort, etc.) in the IP network, or service categories (CBR, VBR, ABR, etc.) in the ATM network.

Different protocols (TCP/IP, DECnet, SNA, AppleTalk, etc.).

Different applications (ftp, telnet, etc.).

Different organizations sharing the same packet buffer device (company by company, etc.).

By treating these as different flows in the packet buffer device, their traffics can be separated from each other in this fourth embodiment.

First, with reference to FIG. 12, the general fair queueing with weights among flows will be described.

In this case, the packet buffer device aims to output packets stored in the device fairly according to the weights of their flows. Here, the operation is easier to comprehended when a FIFO for each flow as shown in FIG. 12 is considered. FIG. 12 shows three queues (FIFOs) for three flows (flow-1, flow-2 and flow-3), and each queue stores packets of various lengths. In FIG. 12, a numerical value assigned to each packet indicates a length of each packet in bytes.

A processing to be carried out when a packet is entered into this packet buffer device is to judge the flow to which the entered packet belongs and store the entered packet into a queue for that flow.

On the other hand, the packets must be outputted fairly among flows, and an order of queues from which packets are to be outputted is an important factor. Here, one exemplary scheme will be described for an exemplary state shown in FIG. 12. Here, for the sake of simplifying the explanation, the weights of all the flows are assumed to be equal. Also, a unit for establishing fairness is assumed to be set 500 bytes in this example.

First, a total 500 bytes part of packets including a packet in a length of 300 bytes and a packet in a length of 200 bytes are outputted from a head of the queue for the flow-1. Next, two packets in a length of 250 bytes each are outputted consecutively from a head of the queue for the flow-2. Then, a packet in a length of 500 bytes is outputted from a head of the queue for the flow-3. By outputting packets in this manner, the packets for 500 bytes part are outputted from each flow at this point, so that it can be said that the packets are outputted fairly. The output of the packets for 500 bytes part from each flow is subsequently repeated, starting from the flow-1 again. In this manner, the packets can be outputted fairly among the flows.

Note that, in the above scheme, the packet output is fair in each 500 bytes unit, but the packet output is not necessarily fair in a smaller unit. However, it is known that the realization of the strict fairness requires a very large processing power to the packet buffer device, and the fairness at a level described above is often considered sufficient in practice.

Now, a number of flows is three in the above description, but when the packet buffer device handles a huge number of flows, how to search the flows which store packets in the queues and how to output the packets fairly can be problems. This fourth embodiment resolve these problems by using a concept of a packet group.

Figure 12:
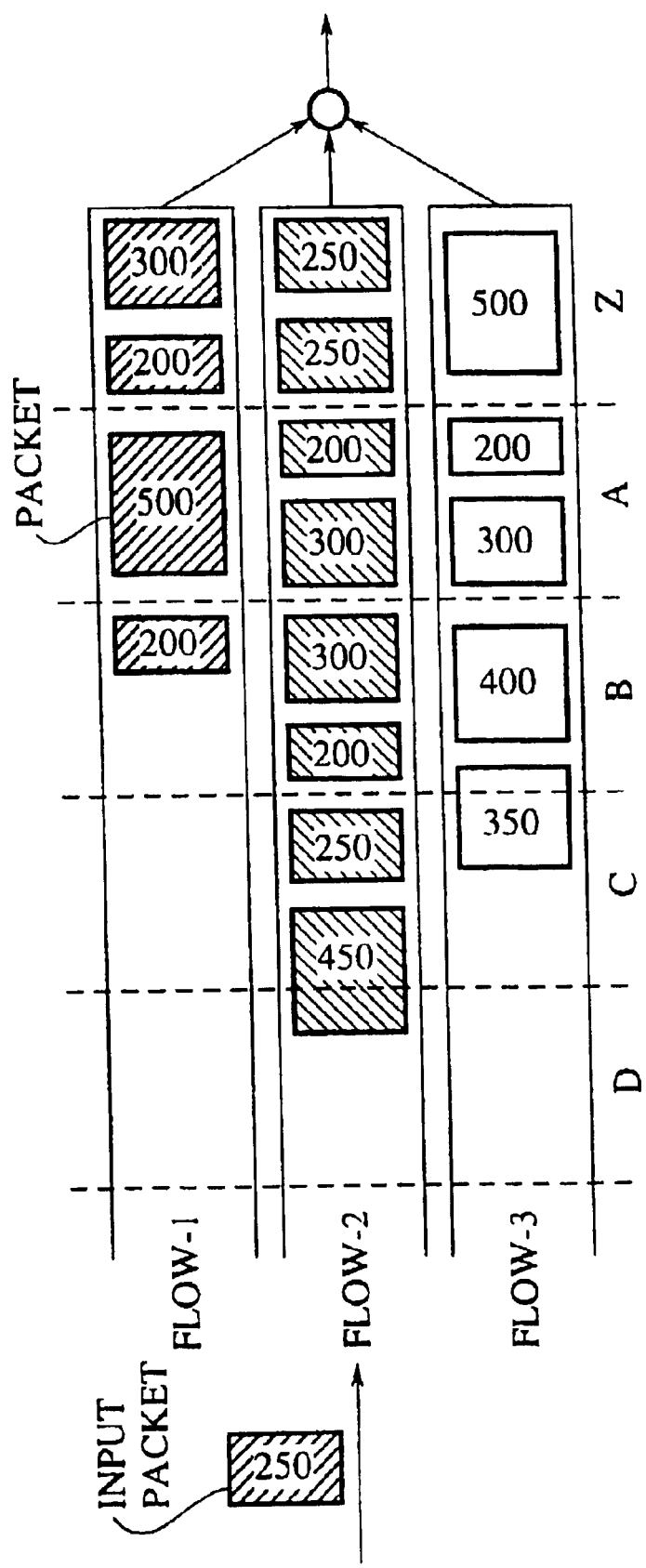
FIG. 12 is a diagram for explaining the per-flow fair queueing to be realized according to the fourth embodiment of the present invention.

In this fourth embodiment, the queues of all the flows are segmented into segments of a constant length such as Z, A, B, C and D as indicated in FIG. 12.

At this point, it is noted that the fair packet output can be realized by outputting the packets in units of these segments. In this fourth embodiment, packets in each segment are managed together as a group called packet group. In one packet group, packets of a plurality of flows are mixedly present.

The packet output is realized by first outputting the packets of a packet group Z which is closest to the output side, and next outputting the packets of a packet group A. Similarly, the packets of the packet groups B, C and D are sequentially outputted thereafter. In this manner, the packet buffer device of this fourth embodiment can output the packets fairly among flows.

Now, for the flow-3, a packet of 350 bytes is stored next to a packet of 400 bytes in the segment B of FIG. 12. In an example of FIG. 12, the upper limit for the packets belonging to the same segment is set to be 500 bytes, so that a packet of 400 bytes and a packet of 350 bytes cannot be included in the same segment B if the packet is not to be divided inside the packet buffer device. Yet, if a packet of 350 bytes which arrived to the packet buffer device later is not entered into the segment B, the segment B is going to have a gap of 100 bytes. The handling of such a case will be described in detail below.

Next, with reference to FIG. 13, one example of the packet buffer device in this fourth embodiment will be described in further detail.

The packet buffer device of this fourth embodiment has packet groups 310, a packet group FIFO 320, a flow table 300, and an output waiting packet group 330.

The packet group 310 is a group of stored packets as described above. In FIGS. 13, A, B, C and D are packet groups. Packets belonging to each packet group 310 are ordered, so that the packet group 310 functions as a FIFO structure.

Figure 13:
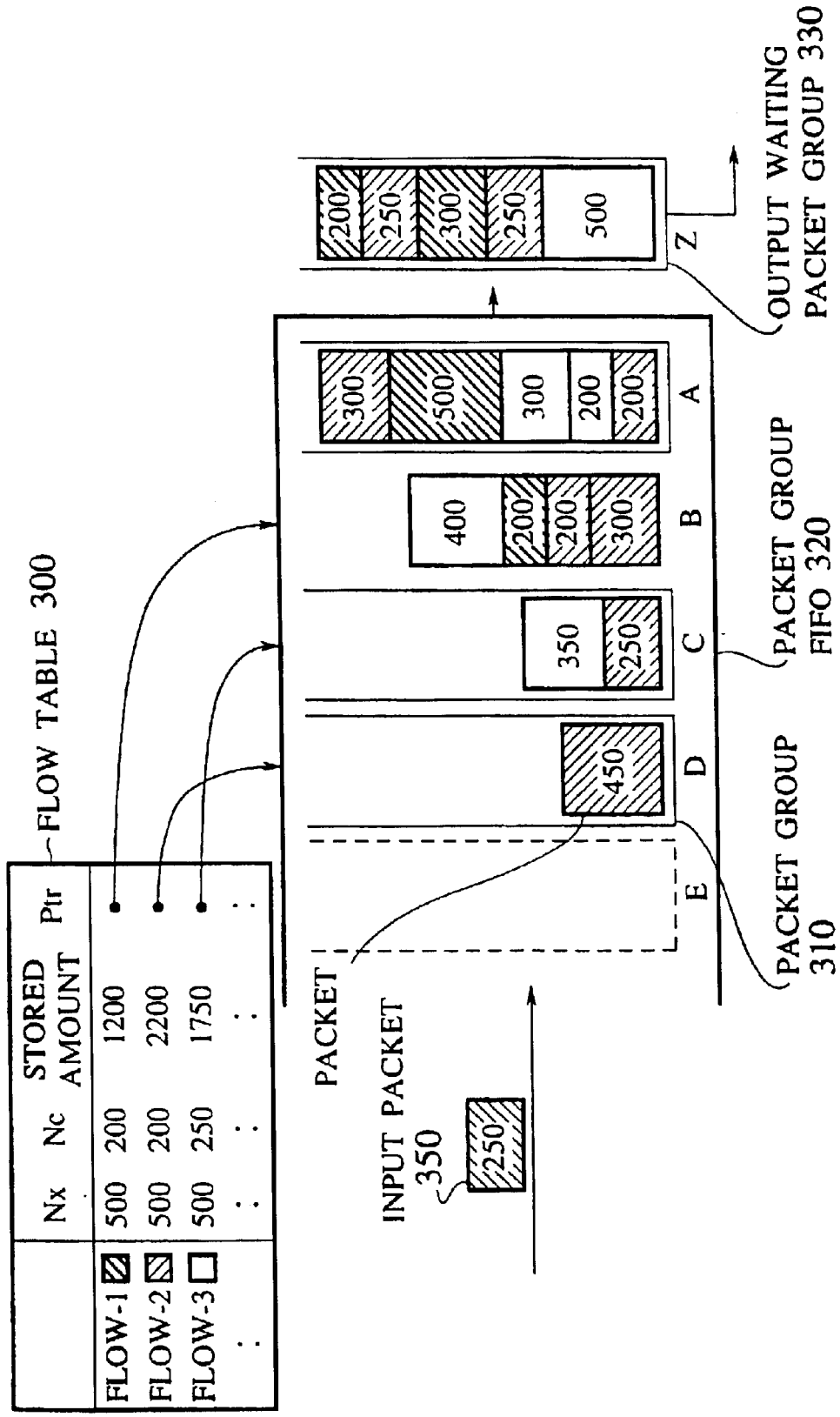
FIG. 13 is a schematic block diagram for explaining operations in a packet buffer device for realizing the per-flow fair queueing according to the fourth embodiment of the present invention.

As shown in FIG. 13, this fourth embodiment manages the packet groups 310 by using a FIFO, where each packet group 310 itself is a FIFO of packets. Here, a FIFO of the packet groups 310 will be referred to as a packet group FIFO 320.

The flow table 300 stores information for each flow, where Nx indicates a weight set for each flow, Nc indicates a working variable for each flow, a stored amount indicates a total amount of stored packets for each flow, and Ptr indicates a pointer to a packet group to which a last arrived packet of each flow belongs. Here, the stored amount is provided for the purpose of indicating whether the packets of each flow are stored in the packet buffer device or not, and given by a total number of bytes of the stored packets of each flow which is held as a variable to which an input packet length is to be added at a time of packet input and from which an output packet length is to be subtracted at a time of packet output.

The output waiting packet group 330 is a packet group outputted from the packet group FIFO 320 (which is a packet group Z in FIG. 13). At a time of outputting packets from the packet buffer device, packets belonging to the output waiting packet group 320 are to be outputted.

When an input packet 350 is entered, it is necessary to determine a packet group 310 to which this input packet 350 is to be entered.

First, whether packets of that flow are currently stored in the packet buffer device or not is checked. This can be judged by referring to the stored amount of that flow in the flow table 300 according to the flow ID information, and check if it is equal to zero or not. When the packets of that flow are not currently stored, the input packet 350 is entered into the head packet group (packet group A in FIG. 13) of the packet group FIFO 320.

Even when the stored amount is greater than zero, as long as Ptr is pointing to the output waiting packet group (packet group Z in FIG. 13), the input packet 350 is entered into the head packet group A of the packet group FIFO 320.

Otherwise, the packet group is determined according the input packet length, Nx, Nc, and Ptr.

Nx of each flow indicates an average amount of packets managed by one packet group for that flow. This Nx is set to a value greater than or equal to the maximum packet length of that flow.

Nc is used to indicate a remaining amount of packets that can be entered by that flow into the packet group pointed by Ptr, by calculating Nx−Nc. When Nx−Nc≧(input packet length), the input packet 350 is entered into the packet group pointed by Ptr, whereas when Nx−Nc<(input packet length), the input packet 350 is entered into a next packet group of the packet group pointed by Ptr on the packet group FIFO 320.

When the packet group is determined, values of Nc and Ptr are updated next. When the first packet for that flow is entered into the head packet group of the packet group FIFO 320, Nc is updated to Nc:=(input packet length). Otherwise, Nc is updated to Nc:=Nc+(input packet length). As a result of this updating, if Nx<Nc, the Nc is further rewritten into Nc:=Nc−Nx (so that 0<Nc≦Nx). Ptr is updated to a pointer to the packet group into which the input packet 350 is entered.

In this fourth embodiment, no two packet groups are going to manage the same one packet. Consequently, when the input packet length exceeds Nx−Nc, the input packet 350 is entered into a next packet group of the packet group pointed by Ptr. However, in the calculation of Nc, one packet is divided into two packet groups. In other words, Nc is updated to Nc:=Nc+(input packet length), and if there is a portion exceeding Nx, then Nc−Nx is set as Nc of the next packet group. By means of this algorithm, Nx packets are going to be belonging to one packet group on average.

Now, the packet input operation in an exemplary case shown in FIG. 13 will be described.

FIG. 13 shows a situation in which the input packet in a length of 250 bytes for the flow-1 has arrived at the packet buffer device. At this point, Ptr of the flow-1 is pointing to the packet group B. In updating the flow table 300, Nc is updated to Nc:=Nc+(input packet length)=200+250=450 according to the above described procedure. This value is less than Nx, so that this input packet is entered into the packet group B pointed by Ptr.

If the packet length of the input packet for the flow-1 is not 250 bytes but 350 bytes, Nc is updated to Nc:=200+350=550 which is exceeding Nx. Consequently, Nc is further updated to Nc:=Nc−Nx=550−500=50, and the input packet is entered into the next packet group C of the packet group B pointed by Ptr. Then, Ptr is changed to the packet group C.

The packet group FIFO 320 is the first-in first-out queue in which a number of queued packet groups can be increases as many as necessary. For example, in FIG. 13, if a packet in a length of 400 for the flow-2 arrives, an empty packet group (packet group E in FIG. 13) will be added next to the packet group D, and this input packet will be entered into that packet group E.

As described, the processing required at a time of packet input is to change the corresponding entry in the flow table 300, enter the input packet 350 into the packet group 310, and add an empty packet group to the packet group FIFO 320 if necessary. This processing at a time of packet input can be carried out without searching through the flow table 300 over a plurality of flows, and therefore a level of complexity of the processing remains unchanged even when a number of flows is increased.

On the other hand, the processing required at a time of packet output is even simpler. Namely, it suffices to simply output the packet from the output waiting packet group. According to the need, the output of the packet group from the packet group FIFO 320 is to be carried before that. This processing at a time of packet output can also be carried out without searching through the flow table 300 over a plurality of flows, and therefore a level of complexity of the processing remains unchanged even when a number of flows is increased.

As described above, a weight Nx of each flow indicates an average amount of packets per one packet group for that flow. In the packet buffer device of this fourth embodiment, the packets are outputted in units of packet groups, so that the output throughput of each flow is proportional to Nx.

According to the packet buffer device of this fourth embodiment, there is not need to carry out the processing to search through the flow table, and therefore the packet buffer device for carrying out the weighted fair queueing while handling variable length packets can be realized easily without being affected by an upper limit of a number of flows that can be set up.

Each packet group in this fourth embodiment manages the packets in their arrival order. In other words, the output order of the packets belonging to the same packet group is going to be the arrival order throughout the entire flows. This property has an effect of reducing the delay jitter of the packets.

Also, compared with the conventional DRR algorithm describe above, the packet buffer device of this fourth embodiment can realize the selection of the output cell for the purpose of the per-VC fair queueing at high speed even when a number of VCs is increased, and in addition, the burstiness of the output traffic is not increased even when the weight values become large. Note that the burstiness does not increase in this fourth embodiment because, at a time of managing the entered packets in a set (packet group), the packets are managed within each set regardless of the flows (VCs), and at a time of outputting the packets from each set (packet group), the packets are outputted regardless of the flows (VCs).

5. A Number of Cells Information Correction Accounting for Delays:

Next, with references to FIG. 14 to FIG. 16, the fifth embodiment of a packet transfer device and a packet transfer method according to the present invention will be described in detail. This fifth embodiment is directed to a case of a cell buffer device for carrying out the priority control among classes, which corrects a number of cells information in order to account for delays.

Figure 14:
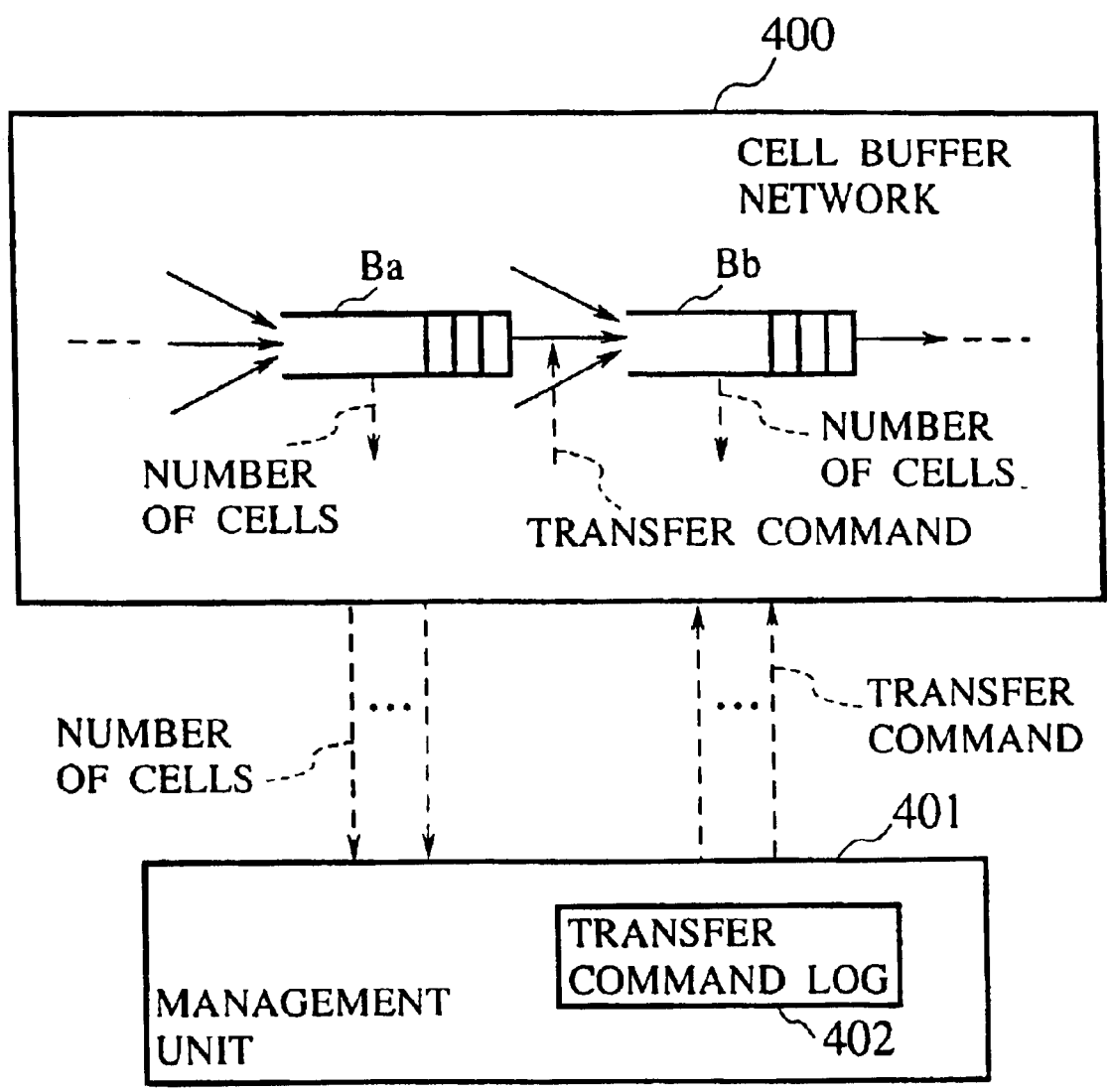
FIG. 14 is a block diagram of a cell buffer device for correcting a number of cells information according to the fifth embodiment of the present invention.

FIG. 14 shows an exemplary configuration of a cell buffer device for correcting a number of cells information according to this fifth embodiment.

The cell buffer device of FIG. 14 generally comprises: a cell buffer network 400 in which more than one cell buffers B (Ba, Bb, etc.) are connected in a plurality of stages (two stages in FIG. 14), and a management unit 401 for receiving a number of cells information from the cell buffer B and issuing a transfer command to the cell buffer B.

The management unit 401 has a feature of holding a transfer command log 402 therein, which is used at a time of determining a new transfer command.

Since a time at which the cell buffer B sent a number of cells information to the management unit 401 until a time at which a transfer command determined by the management unit 401 acts on that cell buffer B, the management unit 401 determines a number of transfer commands acting on that cell buffer B from the transfer command log 402, and determines a new transfer command according to that number of transfer commands and a number of cells information from that cell buffer B.

Next, with references to FIG. 15 and FIG. 16, the operation to correct a number of cells information in the cell buffer device of FIG. 14 in order to account for delays will be described.

Figure 15:
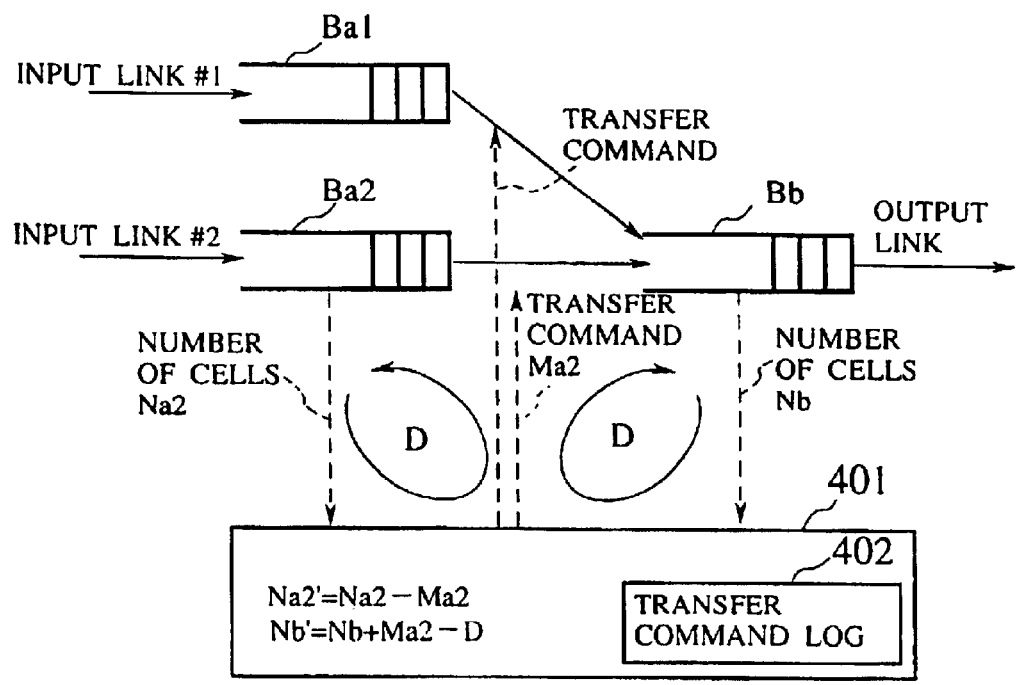
FIG. 15 is a diagram for explaining the operation of the cell buffer device of FIG. 14 according to the fifth embodiment of the present invention.
Figure 16:
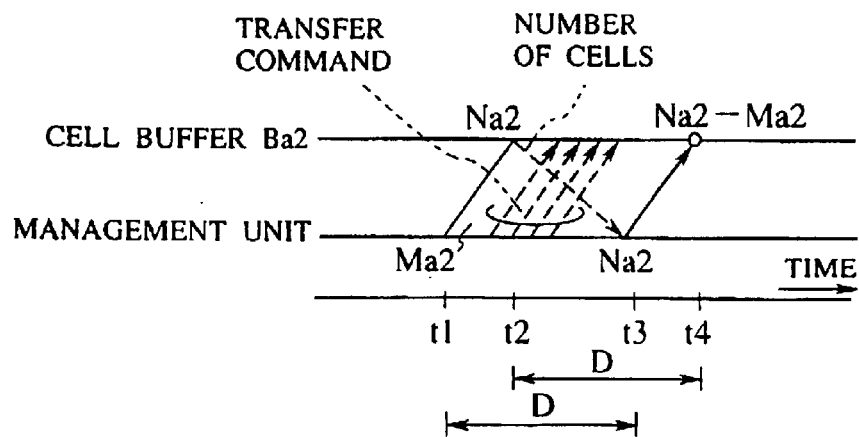
FIG. 16 is a timing chart for explaining the operation of the cell buffer device of FIG. 14 according to the fifth embodiment of the present invention.

In FIG. 15, cells entered from input links #1 and #2 are temporarily stored in cell buffers Ba1 and Ba2 of the front stage, respectively. According to the transfer commands from the management unit 401, cells are transferred to a cell buffer Bb of the back stage, and outputted from the cell buffer Bb to an output link.

The management unit 401 receives a number of cells Na2 of the cell buffer Ba2 and a number of cells Nb of the cell buffer Bb, and issues transfer commands to the cell buffers Ba1 and Ba2.

Now, let D be delay in cell cycle caused while a number of cell information from the cell buffer Ba2 arrives at the management unit 401, a transfer command is determined according to this number of cell information and issued to the cell buffer Ba2, and a number of cells in the cell buffer Ba2 changes in response to that transfer command. In addition, for the sake of simplicity, it is assumed that the same cell cycle D also gives a delay caused while a number of cell information from the cell buffer Bb arrives at the management unit 401, a transfer command is determined according to this number of cell information and issued to the cell buffer Ba1 or Ba2, and a number of cells in the cell buffer Bb changes as cells are transferred from the cell buffer Ba1 or Ba2 to the cell buffer Bb in response to that transfer command.

Figure 17:
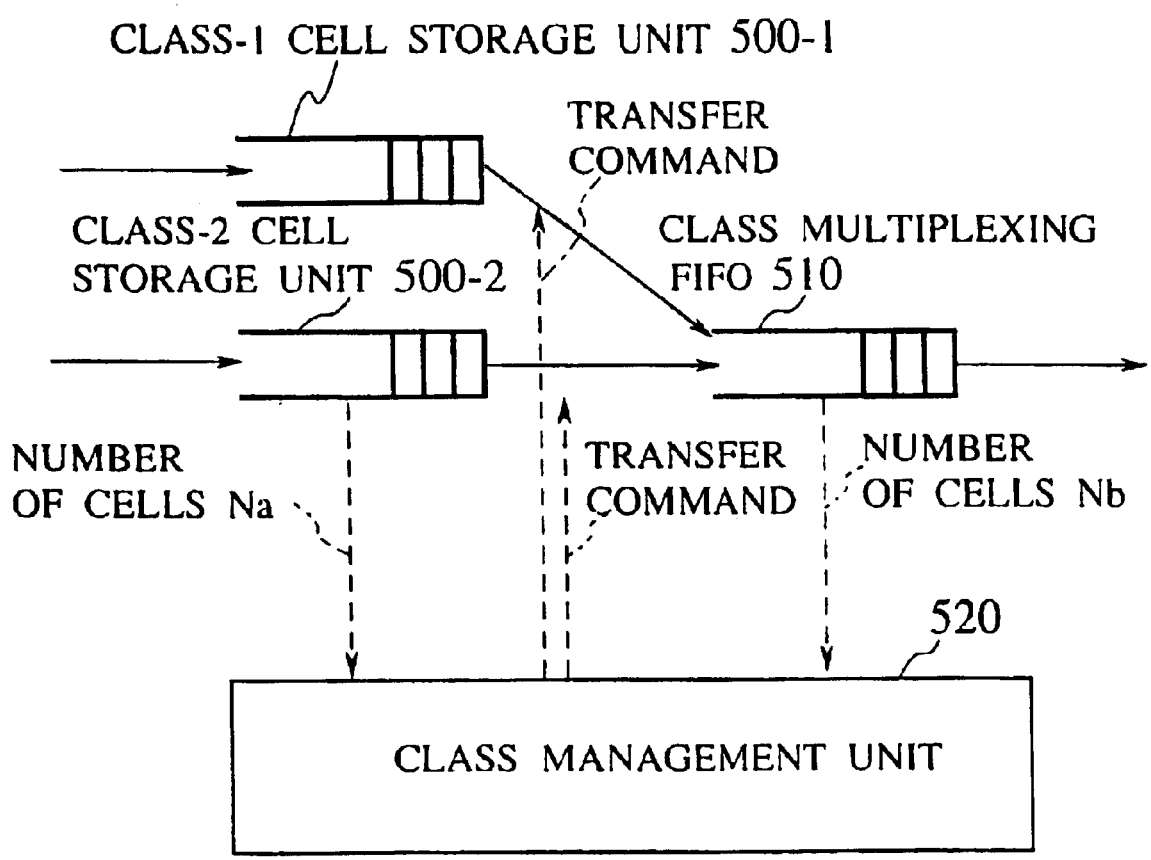
FIG. 17 is a schematic block diagram of a conventional cell buffer device for carrying out the priority control among classes.

Here, the cell buffers Ba1 and Ba2 of FIG. 15 can be considered as corresponding to the class-1 cell storage unit 500-1 and the class-2 cell storage unit 500-2 of FIG. 17, respectively, while the cell buffer Bb of FIG. 15 can be considered as corresponding to the cell multiplexing FIFO 510 of FIG. 17, so that the cell buffer device of FIG. 15 can be considered as a device for carrying out the priority control among classes.

The policies governing the cell transfer among the cell buffers Ba1, Ba2 and Bb are the same as those described above for a case of FIG. 17. Namely, in order to improve the performance of the priority control in this cell buffer device of FIG. 15, it is necessary to keep a number of cells stored in the cell buffer Bb small, but in order not to lower the throughput, it is necessary to command the transfer so that the cell buffer Bb will not become empty as much as possible (that is, so as not to cause the underflow in the cell buffer Bb). In addition, it is necessary to avoid the vain-command (that is, to issue the transfer command with respect to the cell buffer Ba2 only when a stored cell exists in the cell buffer Ba2).

Suppose now that a number of cells information Na2 outputted from the cell buffer Ba2 at a time t2 arrives at the management unit 401, the management unit 401 issues the transfer command at a time t3, and cells are outputted from the cell buffer Ba2 according to that transfer command at a time t4. Here, an information that the management unit 401 needs to know is a number of cells in the cell buffer Ba2 at a time t4 at which the transfer command actually acts on the cell buffer Ba2. This timing is indicated by a blank dot in the timing chart of FIG. 16.

When the cell buffer Ba2 received the transfer command Ma2 times during a period between t2 and t4 (that is, a cell cycle D), the cell buffer Ba2 outputted Ma2 cells during this period, so that a number of cells in the cell buffer Ba2 is Na2−Ma2, assuming that no cell is entered into the cell buffer Ba2 during this period.

Normally, a transmission delay for the transfer command from the management unit 401 to the cell buffer Ba2 is constant, so that a number of transfer commands Ma2 received by the cell buffer Ba2 is equal to a number of transfer commands outputted by the management unit 301 during a period between t1 and t3, where t4−t2=D=t3−t1. Consequently, by learning a number of transfer commands Ma2 from the transfer command log 402, a number of cells decreased in the cell buffer Ba2 during a period between t2 and t4 can be determined accurately.

The similar consideration also applies to the cell buffer Bb, so that a number of cells increased in the cell buffer Bb during a period between t2 and t4 (due to cells transferred from the cell buffer Ba2) can be determined accurately.

The management unit 401 cannot know a number of cells entered into the cell buffer Ba2 during a period between t2 and t4. However, in order to avoid the vain-command with respect to the cell buffer Ba2, a number of cells in the cell buffer Ba2 should be estimated rather smaller, so that it can be safely assumed that there is no cell input from the input link to the cell buffer Ba2 during a period between t2 and t4.

Also, the management unit 401 cannot know a number of cells outputted from the cell buffer Bb during a period between t2 and t4. However, in order to avoid causing the underflow in the cell buffer Bb, a number of cells in the cell buffer Bb should be estimated rather smaller, so that it can be safely assumed that cells are continuously outputted from the cell buffer Bb during a period between t2 and t4 (it is assumed that D cells are outputted during the cell cycle D). In addition, a number of cells entered from the cell buffer Ba1 to the cell buffer Bb is also assumed to be zero.

In summary, a corrected number of cells Na2' in the cell buffer Ba2 and a corrected number of cells Nb' in the cell buffer Bb can be expressed as:

$$Na2'=Na2+0-Ma2,$$

$$Nb'=Nb+Ma2-D.$$

Consequently, the condition by which the management unit 401 issues the transfer command to the cell buffer Ba2 can be given by:

$$(Nb' \leq Th) \text{ and } (Na2' \geq 0),$$

while the condition for the transfer command to the cell buffer Ba1 can be given by:

$$(Nb' \leq Th) \text{ and } (Na2' \leq 0).$$

Here, a threshold Th is normally set equal to "1".

By correcting a number of cells information in this manner, it becomes possible to command the transfer while avoiding the underflow or the vain-command as much as possible.

Note that this scheme for correcting a number of cells information can be easily adapted to the cell multiplexing device for carrying out the priority control among classes such as that of the first embodiment described above.

Moreover, this scheme for correcting a number of cells information can also be easily adapted to the cell multiplexing device for carrying out the per-VC fair queueing such as that of the second embodiment described above.

As described, according to this fifth embodiment, in a cell buffer device in which a delay exists between the cell buffers and the management unit for managing the cell buffers, a number of cells information transmitted from the cell buffer is corrected to a number of cells for a time at which the transfer command actually acts on the cell buffer by using the transfer command log at a time of determining the transfer command, so that lowering of the performance due to the delay can be suppressed.

It is to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A packet transfer device, comprising:

at least one buffer for temporarily storing entered packets; and a control unit for controlling a packet transfer at the buffer, by issuing a packet transfer command to the buffer according to a log of packet transfer command including a plurality of packet transfer commands previously sent to the buffer and a packet storage state of the buffer.

2. The device of claim 1, wherein the control unit determines a number of packet transfer commands acting on the buffer since the buffer notifies the packet storage state to the control unit until a corresponding packet transfer command acts on the buffer according to the log of packet transfer commands, corrects the packet storage state of the buffer according to the determined number of packet transfer commands, and issues the packet transfer command to the buffer according to the corrected packet storage state of the buffer.

3. A method of packet transfer in a packet transfer device formed by at least one buffer and a control unit for controlling a packet transfer at the buffer, the method comprising the steps of:

temporarily storing entered packet at the buffer; and controlling a packet transfer at the buffer, by issuing packet transfer command from the control unit to the buffer according to a log of packet transfer commands including a plurality of packet transfer commands previously sent to the buffer and a packet storage state of the buffer.

\* \* \* \* \*